(12) United States Patent
Crew et al.

(10) Patent No.: US 9,690,577 B1
(45) Date of Patent: Jun. 27, 2017

(54) LEGACY APPLICATIONS AS WEB SERVICES

(75) Inventors: James R. Crew, Princeton Jct., NJ (US); Venkat Raman Pillay, Lawrenceville, NJ (US); Joseph Michael Card, Morristown, NJ (US); Sundar J. Rajan, Bridgewater, NJ (US); Bruno Vitro, Bayonne, NJ (US)

(73) Assignee: Akana, Inc., Los Angeles, CA (US)

( * ) Notice: Subject to any disclaimer, the term of this patent is extended or adjusted under 35 U.S.C. 154(b) by 2373 days.

(21) Appl. No.: 10/775,654

(22) Filed: Feb. 9, 2004

(51) Int. Cl.
*G06F 3/0481* (2013.01)
*G06F 9/22* (2006.01)
*G06F 3/01* (2006.01)
*G06F 9/44* (2006.01)

(52) U.S. Cl.
CPC .............. *G06F 9/22* (2013.01); *G06F 3/01* (2013.01); *G06F 3/0481* (2013.01); *G06F 9/4443* (2013.01)

(58) Field of Classification Search
CPC ... G06F 3/033; G06F 3/16; G06F 3/00; G06F 3/048; G06F 9/4443; G06F 3/0481
USPC ........................................................ 715/749
See application file for complete search history.

(56) References Cited

U.S. PATENT DOCUMENTS

| | | | | |
|---|---|---|---|---|
| 5,857,194 A * | 1/1999 | Kelliher et al. | | |
| 6,209,124 B1 * | 3/2001 | Vermeire et al. | | 717/114 |
| 6,466,937 B1 * | 10/2002 | Fascenda | | 707/622 |
| 6,473,807 B1 * | 10/2002 | Hills et al. | | 719/330 |
| 6,601,234 B1 * | 7/2003 | Bowman-Amuah | | 717/108 |
| 6,993,745 B1 * | 1/2006 | Ballantyne et al. | | 717/109 |
| 7,882,497 B2 * | 2/2011 | Nanivadekar et al. | | 717/138 |
| 7,904,819 B2 * | 3/2011 | Cohen et al. | | 715/746 |
| 2001/0037415 A1 * | 11/2001 | Freishtat et al. | | 709/328 |
| 2002/0035559 A1 * | 3/2002 | Crowe et al. | | 707/2 |
| 2002/0091818 A1 * | 7/2002 | Cascio et al. | | 709/224 |
| 2002/0095576 A1 * | 7/2002 | Stoltz et al. | | 713/175 |
| 2002/0178299 A1 * | 11/2002 | Teubner | | 709/320 |
| 2003/0115025 A1 * | 6/2003 | Lee et al. | | 703/1 |
| 2003/0193521 A1 * | 10/2003 | Chen et al. | | 345/762 |
| 2004/0098595 A1 * | 5/2004 | Aupperle et al. | | 713/185 |
| 2004/0148609 A1 * | 7/2004 | Jimenez et al. | | 719/315 |
| 2004/0205612 A1 * | 10/2004 | King et al. | | 715/522 |
| 2004/0249691 A1 * | 12/2004 | Schell et al. | | 705/8 |

(Continued)

OTHER PUBLICATIONS

Erik Christensen et al., "*Web Services Description Language (WSDL)*", Ariba, International Business Machines Corp., Microsoft, 2001, ver. 1.1, pp. 14 pgs., http://www.w3.org/TR/wsdl.

(Continued)

*Primary Examiner* — Doon Chow
*Assistant Examiner* — Le Nguyen
(74) *Attorney, Agent, or Firm* — Baker Botts L.L.P.

(57) ABSTRACT

A legacy application may be executed as a Web Service by receiving from a client application a request comprising application input data that includes target legacy program identifying information and a template identifier, loading the specified template, translating the input data into a data format compatible with the application, executing the application and translating the output data for transmission to the client application. The template corresponds to the legacy application and comprises metadata describing the application flow and the required input data and output data for the application.

30 Claims, 35 Drawing Sheets

(56) References Cited

U.S. PATENT DOCUMENTS

2005/0044197 A1* 2/2005 Lai .............................. 709/223
2005/0060610 A1* 3/2005 Leary et al. .................... 714/25
2005/0131985 A1* 6/2005 McElhannon ................ 709/201

OTHER PUBLICATIONS

"*Integrate CICS Applications as Web Services*", A HostBridge™ White Paper, Jun. 4, 2002, 7 pgs., http://www.hostbridge.com/white_papers/web_services/webservicesWhitePaper.pdf.
Martin Gudgin et al., "*SOAP Version 1.2 Part 1: Messaging Framework*", W3C, Jun. 24, 2003, 54 pgs., http://www.w3.org/TR/soap12-part1/.

\* cited by examiner

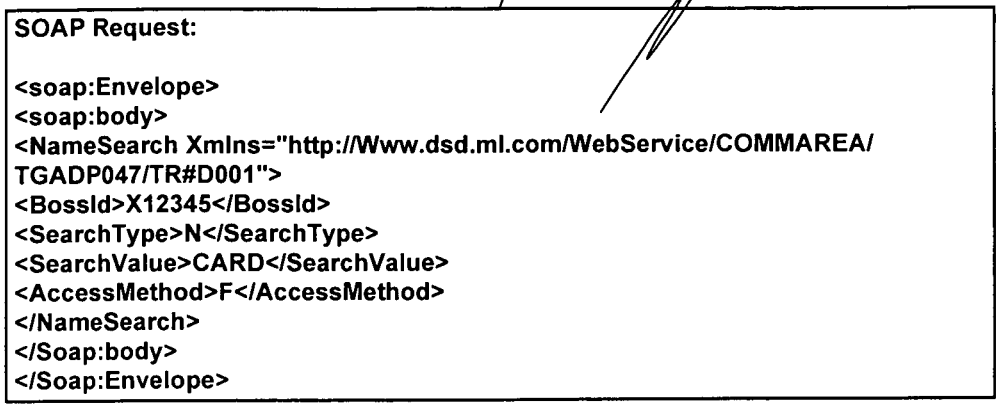
FIG. 8A
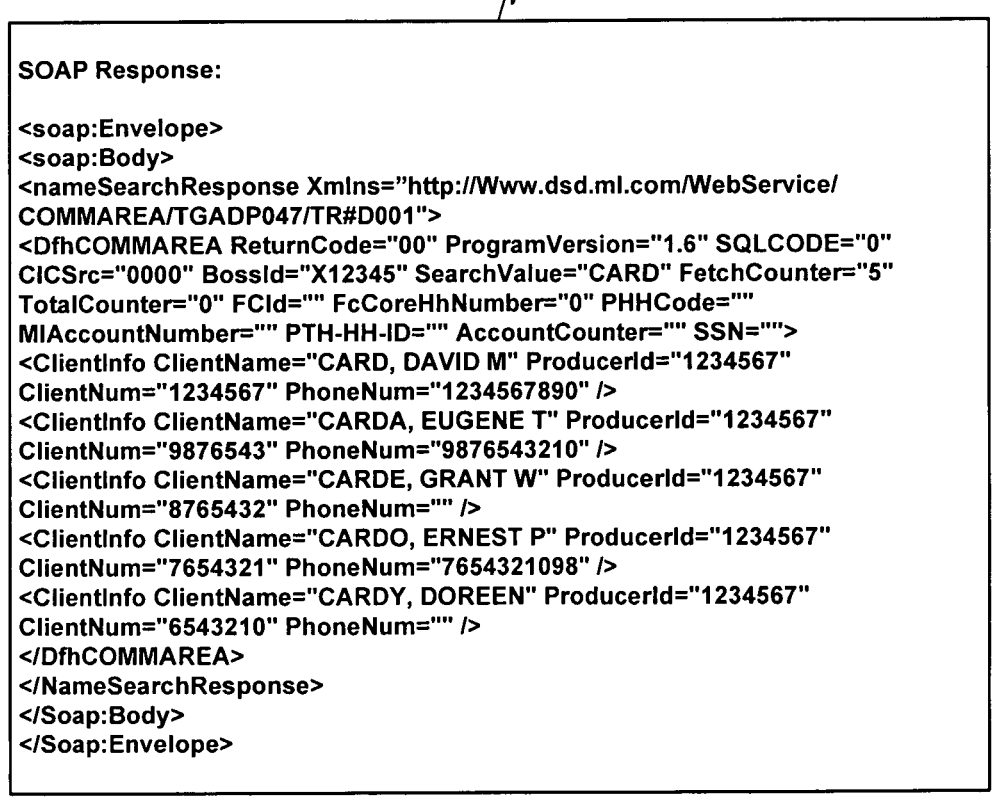
FIG. 8B
FIG. 8

1300

Compile Parameters

```
//COB2      EXEC   PGM=IGYCRCTL,
//   COND=(4, LT, TRN),
//   PARM=(,
//   'TERM,NOSSR,NODYNAM,LIB,OBJECT,RENT,RES,APOST,TRUNC(OPT)',
//   ',OPT,NUMPROC(PFD),LIST,NOFDUMP',
//   )
```

Cross Reference

```
Defined    Cross-reference of data names      References

33      DFHCOMMAREA
   37      INPUT-CHARACTER  . . . . . . .     M108 110 M131
   34      INPUT-FIELDS . . . . . . . . .     111
   35      INPUT-NUMBER
   36      INPUT-99 . . . . . . . . . . .     22 106 107 130
```

FIG. 13B

Data Division Map

```
Data Division Map
Source  Hierarchy and                          Base       Hex-Displacement
LineID  Data Name                              Locator    Blk   Structure
   16   PROGRAM-ID TGADP047---------------------------------------------
   33   1  DFHCOMMAREA . . . . . . . . . . . . BLW=00000  008
   34   2   INPUT-FIELDS. . . . . . . . . . . . BLW=00000  008   0 000 000
   35   3    INPUT-NUMBER. . . . . . . . . . . . BLW=00000  008   0 000 000
   36   88    INPUT-99. . . . . . . . . . . .
   37   3    INPUT-CHARACTER . . . . . . . . . . BLW=00000  00A   0 000 000
```

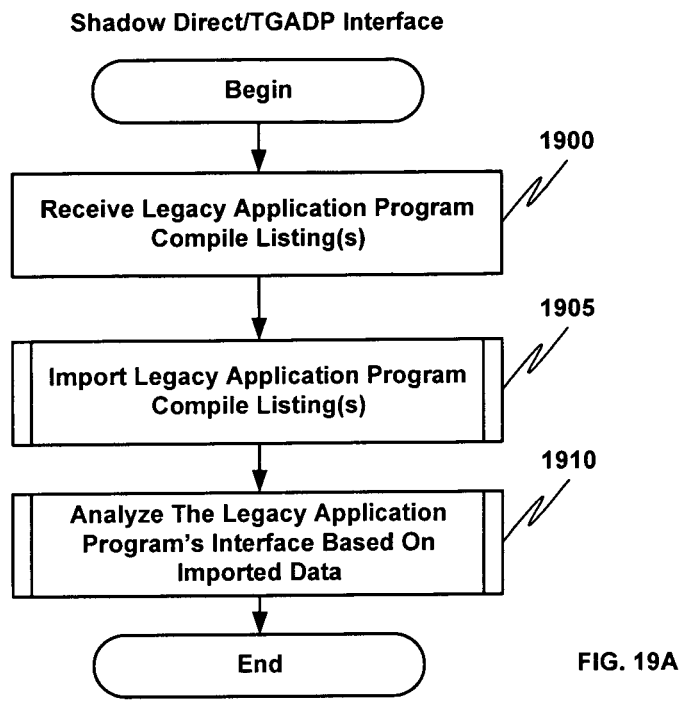
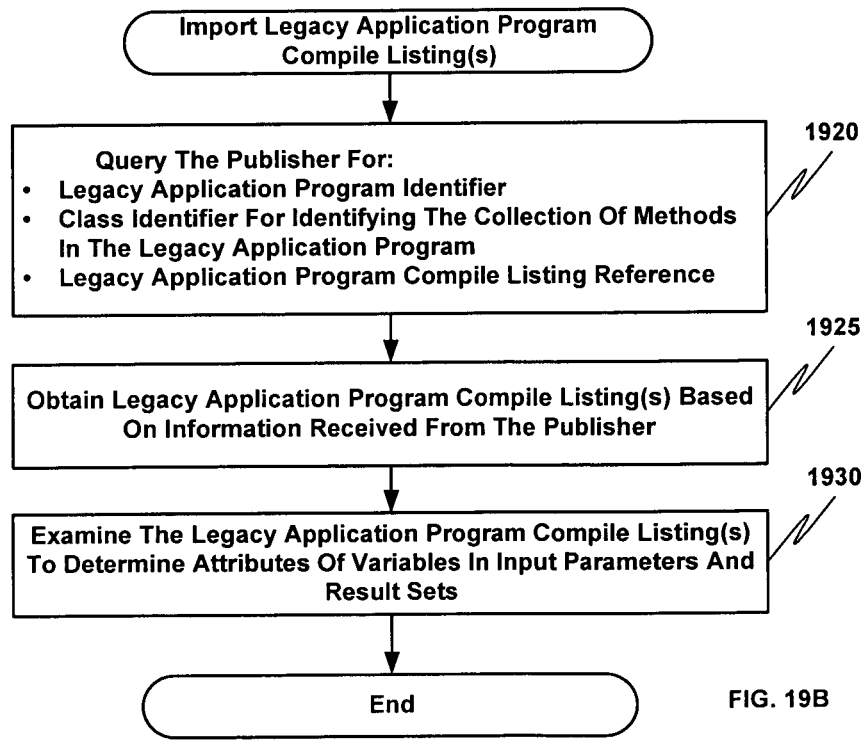
FIG. 19

LEGACY APPLICATIONS AS WEB SERVICES

FIELD OF THE INVENTION

The present invention relates to the field of computer science. More particularly, the present invention relates to legacy applications as Web Services.

BACKGROUND OF THE INVENTION

Historically, various mainframe application developers developed their own applications (hereinafter referred to as "legacy applications") and their own application programming interfaces (APIs) by which programs communicated with other programs. This has created an environment where a user or programmer must learn the details of each vendor's transactional processing system in order to use it. A programmer working with a particular transactional processing system must custom design transactional programs consistent with the vendor-specific protocols for that transactional processing system. As a general matter, transactional programs are executed by a processing mechanism, but software protocols may differ from vendor to vendor. If the same transactional program is to be used later in conjunction with another transaction support product, the program must be modified to comply with the next vendor's protocols.

The most widely used transaction processing system in the world today is a product of IBM, called CICS. CICS was introduced in the late 1960s, and has grown steadily in usage around the world. CICS is a registered trademark of IBM.

With the advent of distributed computing, attempts have been made to integrate legacy applications with distributed applications and systems. In one solution, a proxy program is used to interface between a legacy application program and a client application. This is illustrated in FIG. 1A. FIG. 1A is a block diagram that illustrates using a proxy program to interface with a legacy application. As shown in FIG. 1A, a client application 100 communicates with a server 110 via a network 105 such as the Internet/Intranet. A network interface 115 of server 110 handles communications between the client application 100 and the server 110. A proxy program 120 is required for each legacy application 125 on the server 110. The proxy program 120 receives a request from the client application 100, converts the request into a form that the legacy application 125 expects, accepts result data provided by the legacy application 125, converts the result data into a format required by the client application 100, and returns the converted result data to the client application 100. Thus, the proxy program contains both metadata describing the data format, and the logic responsible for data translation and execution of the legacy application program. Unfortunately, this solution requires writing a separate proxy program 120 for each legacy application 125. This means that changing the runtime environment often requires recoding the proxy program 120, often at significant expense.

In another solution, a legacy application program is modified to interface with a client application. This is illustrated in FIG. 1B. FIG. 1B is a block diagram that illustrates interfacing with a legacy application by modifying the legacy application. As shown in FIG. 1B, a client application 150 communicates with a server 160 via a network 155 such as the Internet. A network interface 165 of server 160 handles communications between the client application 150 and the server 160. The network interface 165 communicates directly with a legacy application 170 that has been modified to accept input data and return result data in a format acceptable to the client application 150. Unfortunately, this solution requires recoding each legacy application program 170.

Accordingly, a need exists in the art for a solution that provides a Service Oriented Architecture (hereinafter referred to as "SOA") interface to legacy applications without requiring coding changes to the legacy applications and without requiring the coding of proxy programs. A further need exists for such a solution that requires relatively less coding upon changing the interface between a client application and the server where the legacy application program resides. Yet a further need exists for such a solution that requires relatively less knowledge of communication protocols or programming languages in order to provide the SOA interface.

SUMMARY OF THE INVENTION

A legacy application may be executed as a Web Service by receiving from a client application a request comprising application input data that includes target legacy program identifying information and a template identifier, loading the specified template, translating the input data into a data format compatible with the application, executing the application and translating the output data for transmission to the client application. The template corresponds to the legacy application and comprises metadata describing the application flow and the required input data and output data for the application.

According to one aspect, the execution of dynamic SQL queries is supported.

According to another aspect, an Application Programming Interface (API) allows programs to directly consume and produce requests and responses.

According to another aspect, a legacy application acts as a Web Service Client and consumes external Web Services.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 8A is a block diagram that illustrates a SOAP request in accordance with one embodiment of the present invention.

FIG. 8B is a block diagram that illustrates a SOAP response in accordance with one embodiment of the present invention.

FIG. 13A is a block diagram that illustrates compile parameters for producing a compile listing.

FIG. 13B is a block diagram that illustrates a cross reference of data names.

FIG. 13C is a block diagram that illustrates a data division map.

FIG. 19A is a flow diagram that illustrates a method for creating a Shadow Direct/TGADP interface template in accordance with one embodiment of the present invention.

FIG. 19B is a flow diagram that illustrates a method for importing a shadow direct/TGADP interface legacy application program compile listing in accordance with one embodiment of the present invention.

DETAILED DESCRIPTION

Figure 1:
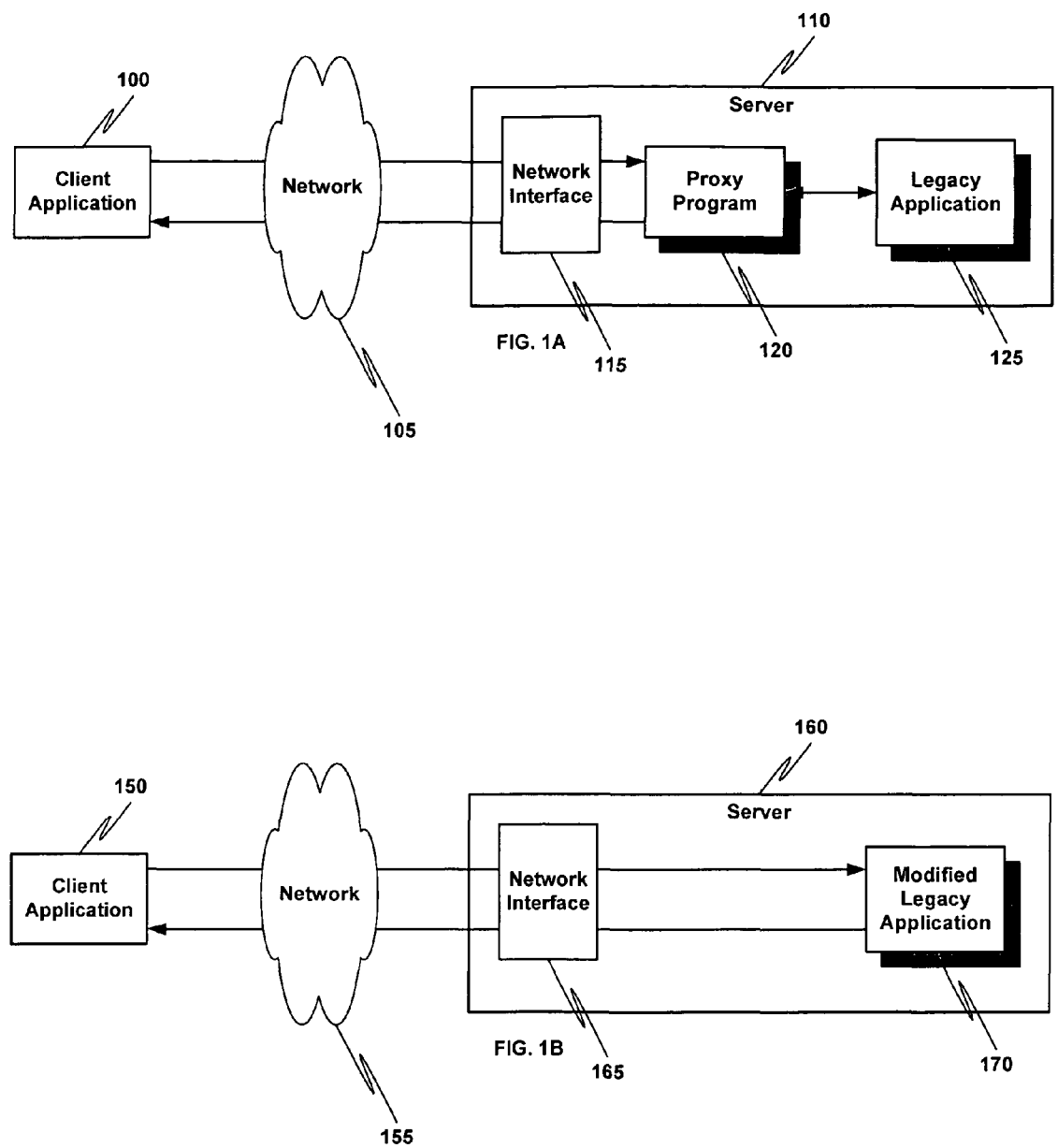
FIG. 1A is a block diagram that illustrates using a proxy program to interface with a legacy application.
FIG. 1B is a block diagram that illustrates interfacing with a legacy application by modifying the legacy application.

Embodiments of the present invention are described herein in the context of legacy applications as Web Services. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer running CICS, available from IBM, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet or World Wide Web ("Web"), cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

In the context of the present invention, the term "legacy application program" describes an application program configured to execute on a computer and to (1) receive input data in a first predetermined format, (2) produce output data in a second predetermined format, or both.

In the context of the present invention, the term "legacy application program publisher" describes an entity that configures a system hosting a legacy application program to make the legacy application available for use as a Web Service. A legacy application program publisher may be a person or a computer program.

Figure 28:
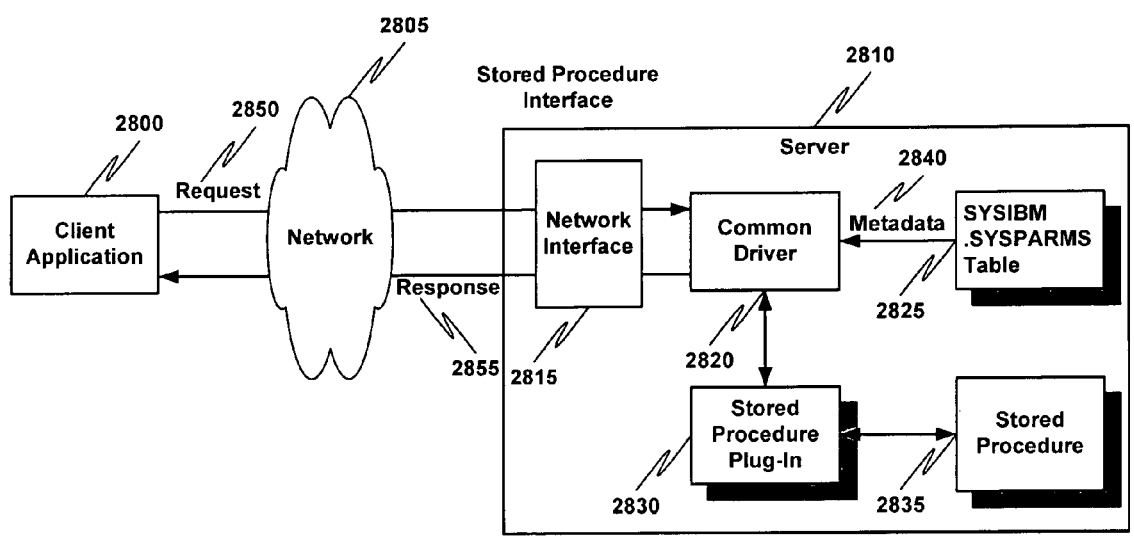
FIG. 28 is a block diagram that illustrates a system for using stored procedure interface legacy applications as Web Services in accordance with one embodiment of the present invention.
Figure 29:
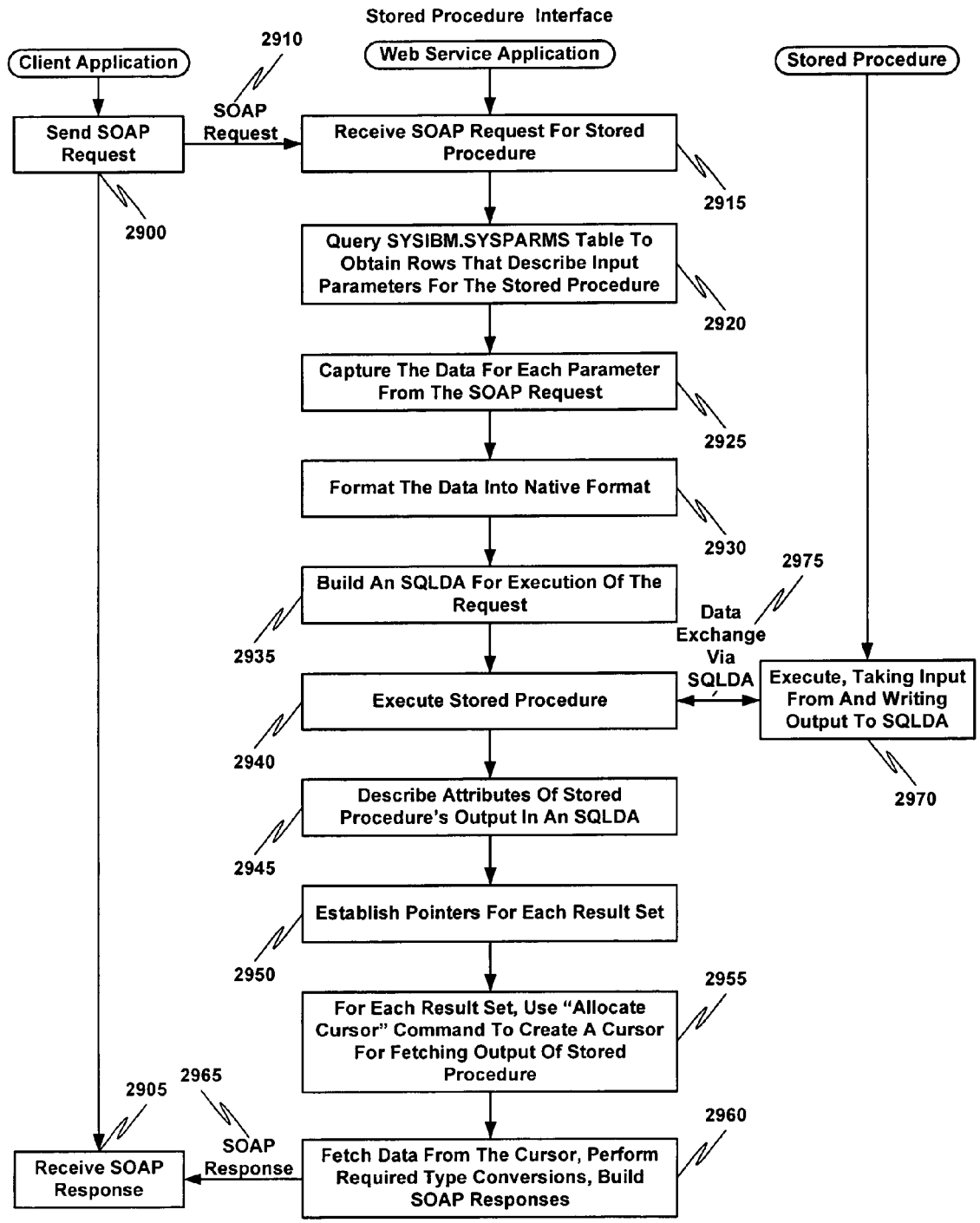
FIG. 29 is a flow diagram that illustrates a method for using stored procedure interface legacy applications as Web Services in accordance with one embodiment of the present invention.
Figure 30:
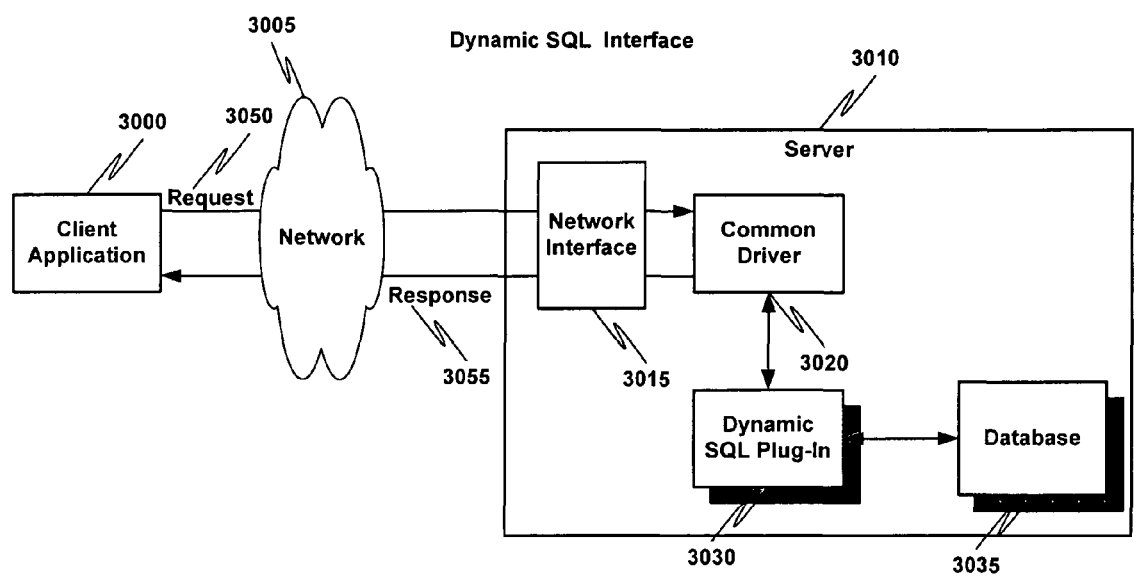
FIG. 30 is a block diagram that illustrates a system for executing dynamic SQL queries against mainframe DB2 as Web Services in accordance with one embodiment of the present invention.
Figure 31:
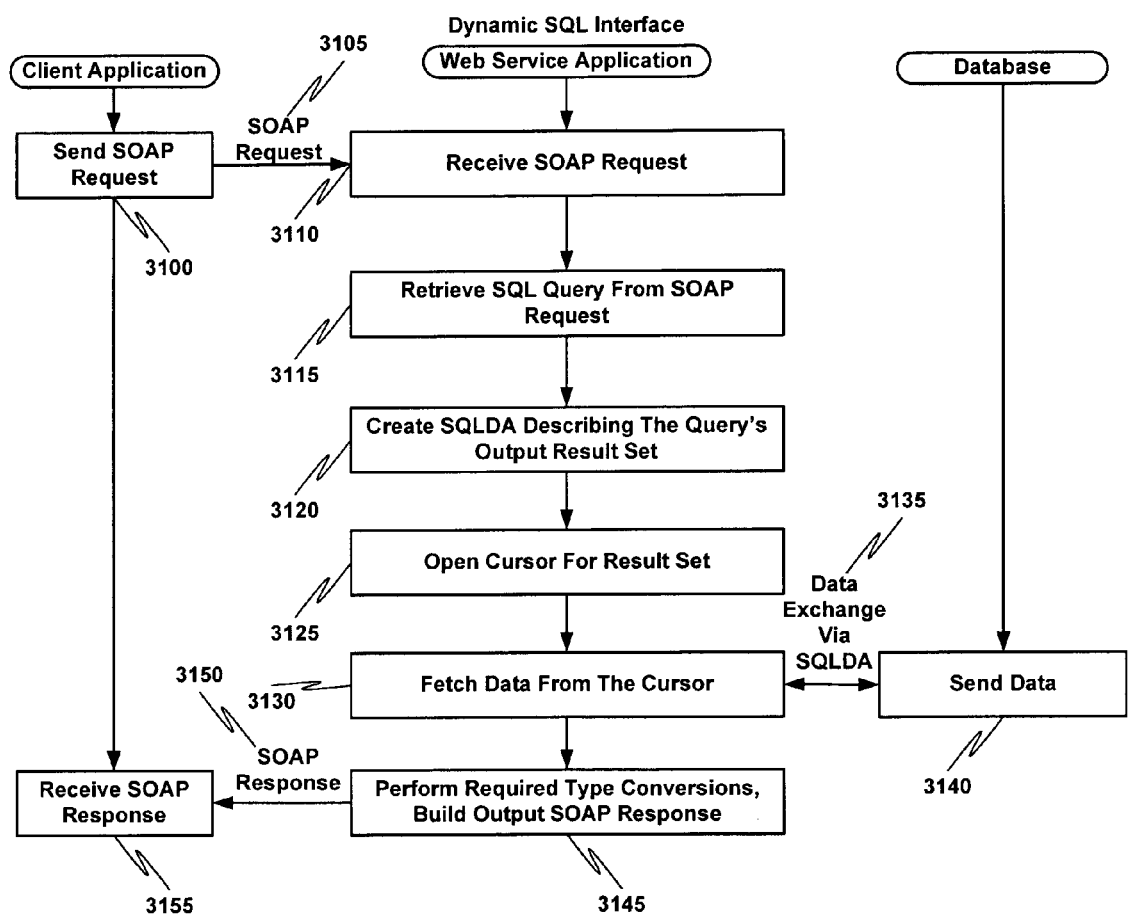
FIG. 31 is a flow diagram that illustrates a method for executing dynamic SQL queries against mainframe DB2 as Web Services in accordance with one embodiment of the present invention.

FIGS. 2-35 illustrate using legacy applications as Web Services in accordance with embodiments of the present invention, and FIGS. 32-35 illustrate enabling a legacy application program to execute a Web Service via a callable interface in accordance with embodiments of the present invention. FIGS. 2-5 illustrate using legacy applications as Web Services at a high level, while FIGS. 6-35 illustrate various interfaces using legacy applications as Web Services. In more detail, FIGS. 6-15 illustrate using COM-MAREA interface legacy applications as Web Services. FIGS. 16-20 illustrate using shadow direct/TGADP interface legacy applications as Web Services. FIGS. 23-27 illustrate using EPI/3270 interface legacy applications as Web Services. FIGS. 28 and 29 illustrate using stored procedure interface legacy applications as Web Services. FIGS. 30 and 31 illustrate using dynamic SQL interface as Web Services.

Figure 2:
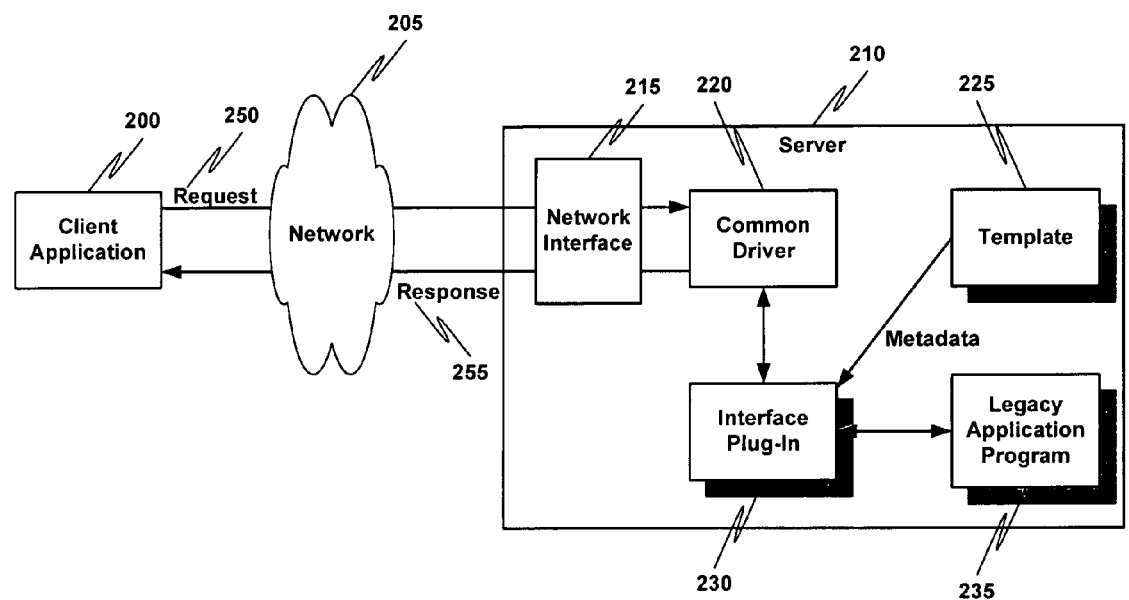
FIG. 2 is a block diagram that illustrates a system for using legacy applications as Web Services in accordance with one embodiment of the present invention.

Turning now to FIG. 2, a block diagram that illustrates a system for using legacy applications as Web Services in accordance with one embodiment of the present invention is presented. As shown in FIG. 2, a client application 200 is in communication with a server 210 via network 205. Server 210 comprises a network interface 215, a common driver 220, one or more templates 225, one or more interface plug-ins 230, and one or more legacy applications 235. Network interface 215 is configured to handle communications between the client application 200 and common driver 220 of server 210. Common driver 220 is configured to receive a request 250 from client application 200 via network interface 215, obtain a template 225 specified in the request 250, and pass control to an interface plug-in 230 specified in the request 250. The one or more templates 225 comprise metadata regarding input data and output data for the one or more legacy applications 235. Each of the one or more templates 225 comprise metadata for use in (1) translating the request 250 into a data format understood by a corresponding legacy application program 235 and (2) translating the output from the legacy application program 235 into a response 255 for transmission to client application 200. The one or more interface plug-ins 230 are configured to receive the template 225 and request 250 data received by the common driver 230, format legacy application input data from the request 250 as specified by the template 225, invoke the legacy application 235, format output data as specified by the template 225, and return a reply message 255 containing the output data. Common driver 220 is further configured to return a response 255 to the client application 200 via network interface 215.

Many other devices or subsystems (not shown) may be connected in a similar manner. Also, it is not necessary for all of the components shown in FIG. 2 to be present to practice the present invention, as discussed below. Furthermore, the components may be interconnected in different ways from that shown in FIG. 2. Code to implement the present invention may be operably disposed in system memory or stored on storage media such as fixed disk, floppy disk, or CD-ROM.

According to one embodiment of the present invention, network interface 215 comprises a listener configured to listen to or monitor network communications and to invoke the common driver 220 upon detecting a communication targeted to the common driver 220.

While FIG. 2 illustrates common driver 220 and one or more interface plug-ins 230 as being separate, according to one embodiment of the present invention, common driver 220 and one or more interface plug-ins 230 form a single application program.

According to one embodiment of the present invention, request 250 comprises a Hyptertext Transfer Protocol (HTTP) request and response 255 comprises an HTTP response. According to another embodiment of the present invention, request 250 comprises an MQ request and response 255 comprises an MQ response. Those of ordinary skill in the art will recognize that other request/response protocols may be used.

Figure 3:
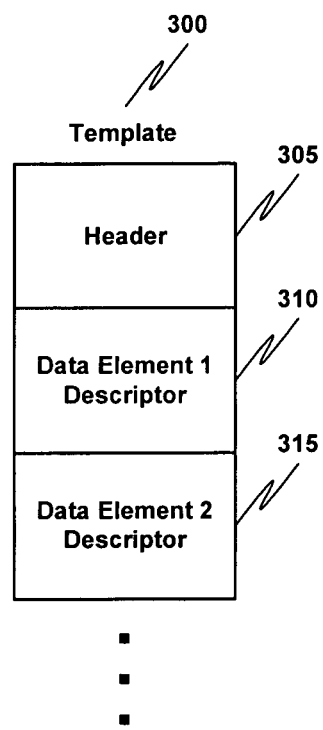
FIG. 3 is a block diagram that illustrates a template in accordance with one embodiment of the present invention.

Turning now to FIG. 3, a block diagram that illustrates a template in accordance with one embodiment of the present invention is presented. FIG. 3 provides more detail for reference numeral 225 of FIG. 2. As shown in FIG. 3, template 300 comprises a header portion 305 and one or more data element descriptors (310, 315). Header portion 305 describes one or more attributes of the legacy application program, such as the legacy application program identifier, a template version number, and the like. Each data element descriptor (310, 315) describes a data element in memory used to communicate information between an interface plug-in and a legacy application program.

Figure 4:
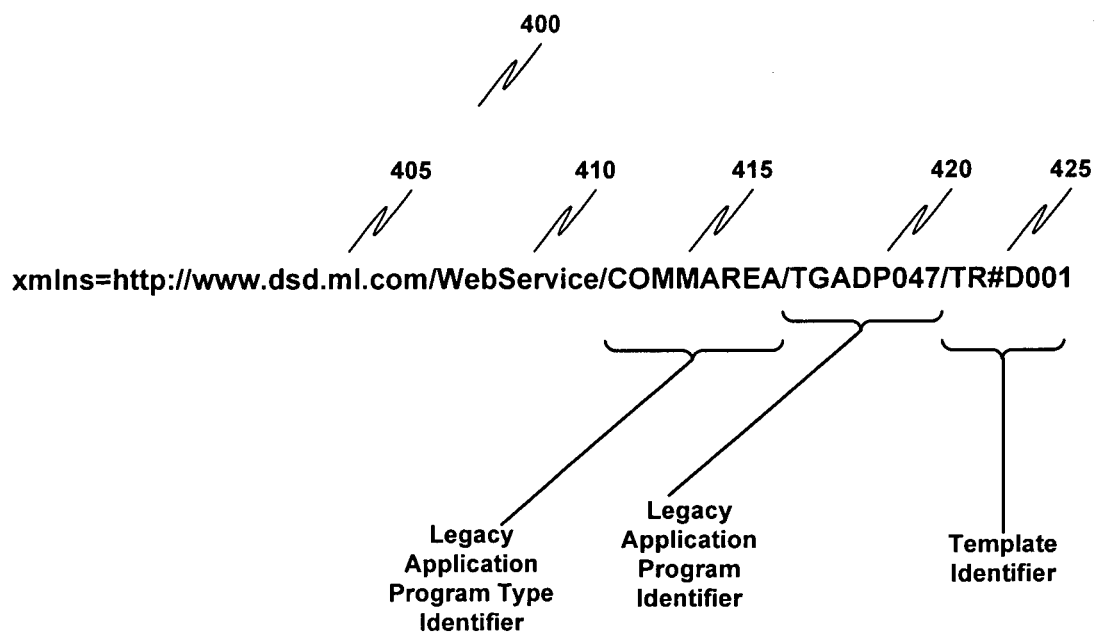
FIG. 4 is a block diagram that illustrates an XML namespace in accordance with one embodiment of the present invention.
Figure 5:
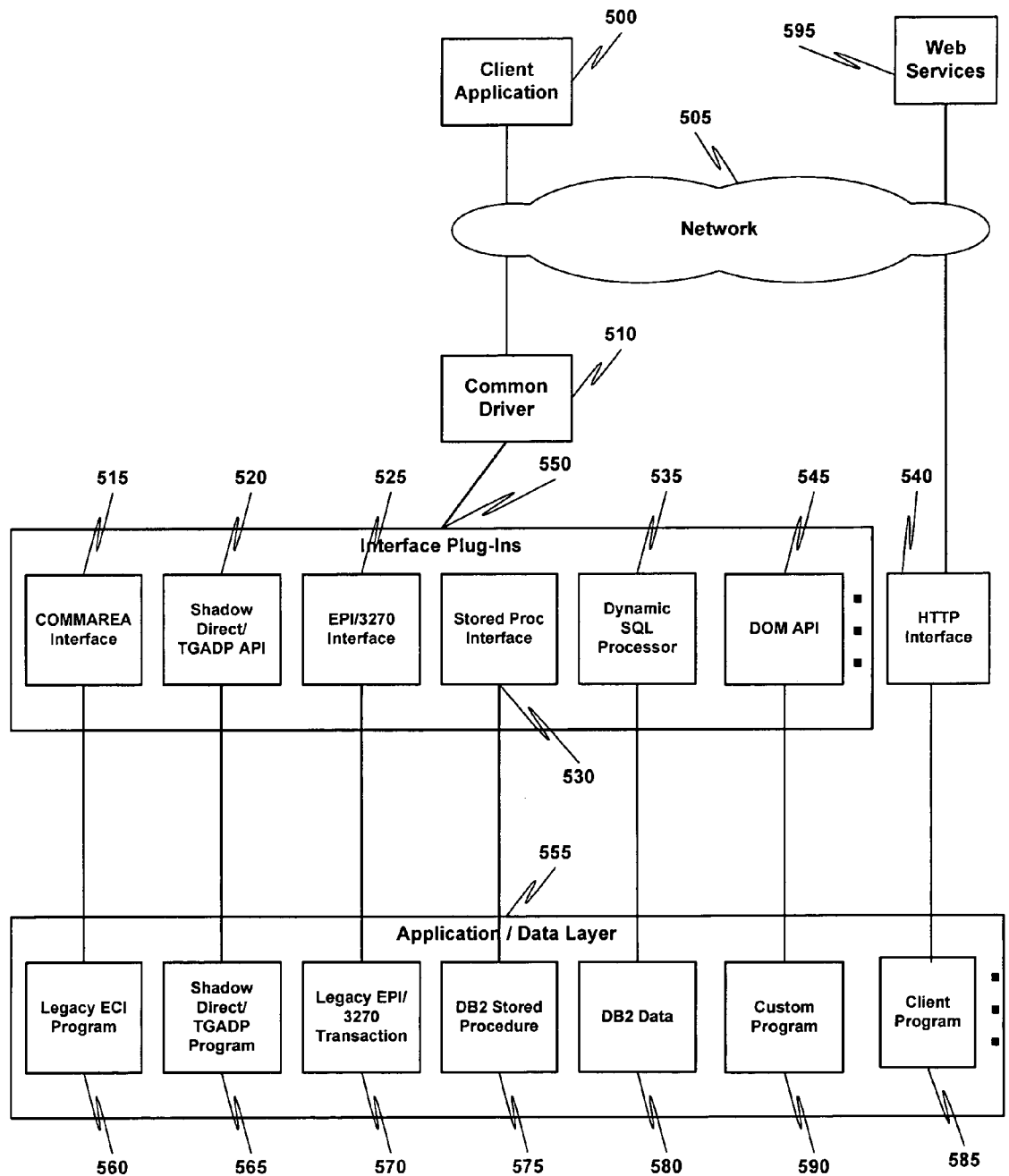
FIG. 5 is a block diagram that illustrates the association between a legacy application and an interface plug-in in accordance with embodiments of the present invention.

Turning now to FIG. 4, a block diagram that illustrates an XML namespace in accordance with one embodiment of the present invention is presented. As shown in FIG. 4, the XML namespace comprises a program/plug-in type 415, a legacy application program identifier 420, and a template identifier 425. The program/plug-in type indicator 415 identifies the legacy application program type as well as the associated plug-in for handling the request. The legacy application program identifier 420 identifies the legacy application program to be invoked. The template identifier 425 identifies a template that determines how to format data from the input SOAP request into a format acceptable to the legacy application program, and how to format result data from execution of the legacy application program, into a SOAP response acceptable to the entity that issued the request Turning now to FIG. 5, a block diagram that illustrates the association between a legacy application and an interface plug-in in accordance with embodiments of the present invention is presented. FIG. 5 illustrates several interfaces supported by embodiments of the present invention. Interface plug-ins 515-545 correspond with legacy application programs 560-590, respectively. The interfaces illustrated in FIG. 5 are for the purpose of illustration only and are not intended to be limiting in any way. The interfaces illustrated in FIG. 5 are described in more detail below.

FIGS. 6-15 illustrate using COMMAREA interface legacy applications as Web Services in accordance with one embodiment of the present invention. FIGS. 6-10 illustrate operational aspects of the interface, and FIGS. 11-15 illustrate creating a template for subsequent use in making a legacy application program available as a Web Service.

Figure 6:
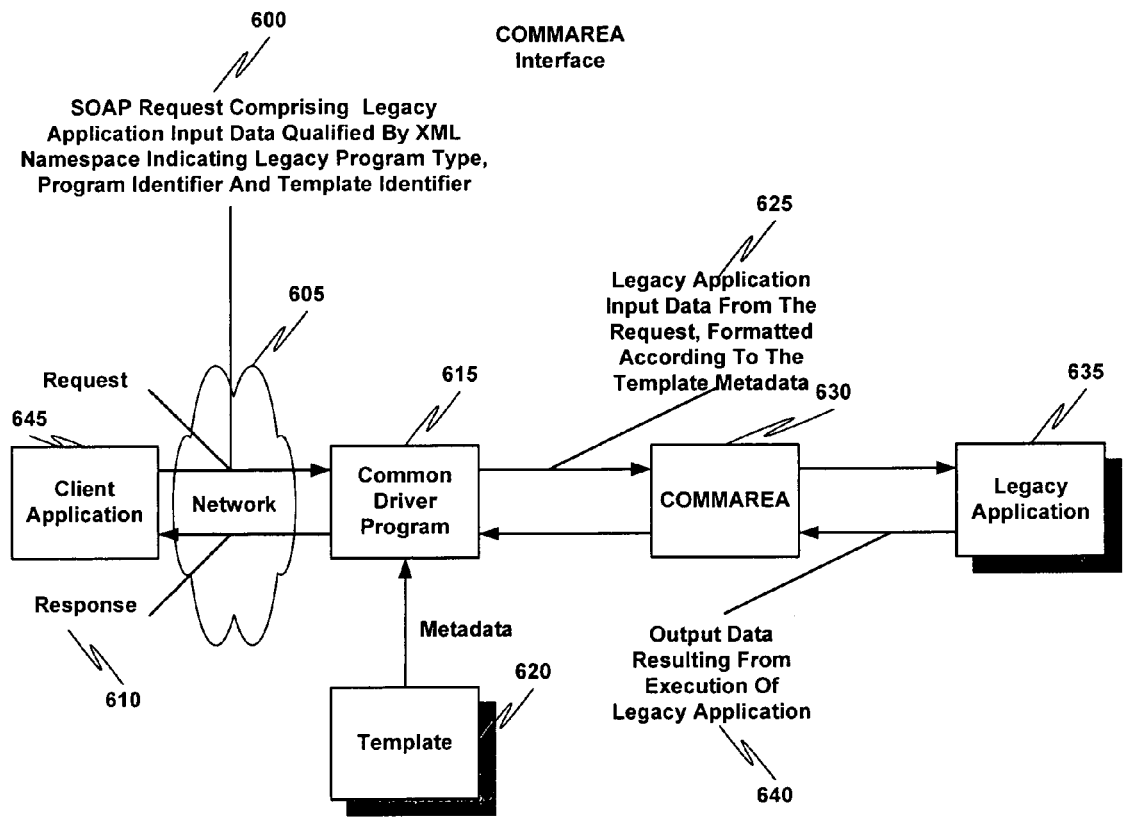
FIG. 6 is a block diagram that illustrates a system for using COMMAREA interface legacy applications as Web Services in accordance with one embodiment of the present invention.

Turning now to FIG. 6, a block diagram that illustrates a system for using COMMAREA interface legacy applications as Web Services in accordance with one embodiment of the present invention is presented. As shown in FIG. 6, client application 645 sends a request 600 to common driver program 615 via network 605. The request 600 includes a legacy application program type indicator, a legacy application program identifier, a template identifier, and legacy application input data. Common driver program 615 is configured to receive the request 600, obtain a template 620 specified in the request 600, format the legacy application input data as specified by the template 620, invoke the legacy application program 635 specified in the request 600, receive output data from the legacy application 635, format the output data as specified by the template 620, and return a response 610 to the client application 645 via network interface 605.

Many other devices or subsystems (not shown) may be connected in a similar manner. Also, it is not necessary for all of the components shown in FIG. 6 to be present to practice the present invention, as discussed below. Furthermore, the components may be interconnected in different ways from that shown in FIG. 6. Code to implement the present invention may be operably disposed in system memory or stored on storage media such as fixed disk, floppy disk, or CD-ROM.

Figure 7:
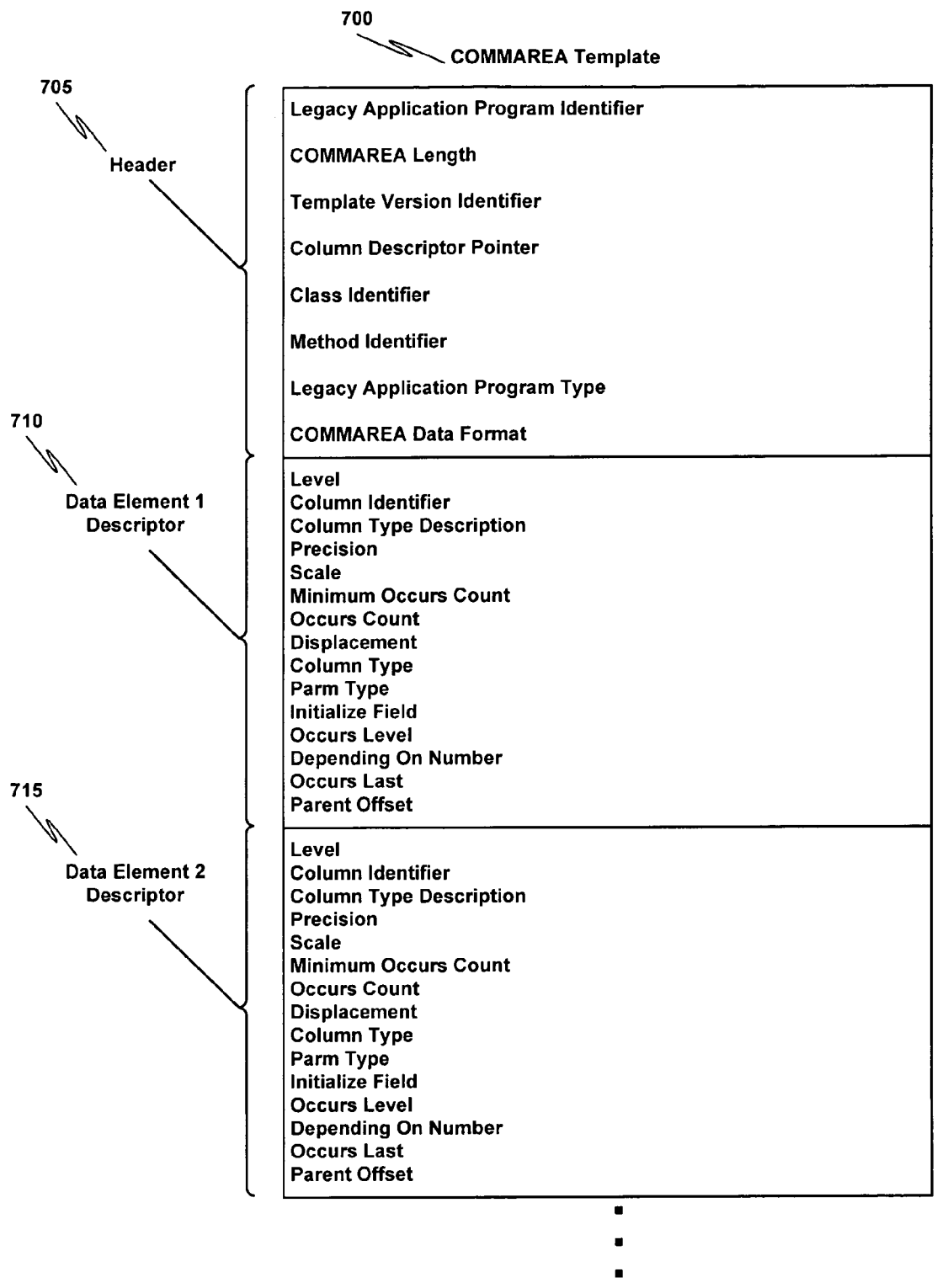
FIG. 7 is a block diagram that illustrates a COMMAREA interface template in accordance with one embodiment of the present invention.

Turning now to FIG. 7, a block diagram that illustrates a COMMAREA interface template in accordance with one embodiment of the present invention is presented. FIG. 7 provides more detail for reference numeral 620 of FIG. 6. As shown in FIG. 7, template 700 comprises a header portion 705 and one or more data element descriptors (710, 715). The header portion 705 describes one or more attributes of the legacy application program. The header portion 705 includes the legacy application program identifier, a COMMAREA length describing the maximum size of the common memory area used to communicate legacy application input data and output data between the interface plug-in and the legacy application program, a template version identifier, a column descriptor pointer that points to a description of the individual items in the COMMAREA, a class identifier for the legacy application program, a method identifier for the particular function performed by the legacy application program, a legacy application program type (ECI, EPI, Shadow, etc.), and a COMMAREA data format. The COMMAREA data format may be, by way of example, ASCII or EBCDIC. The order that each header item occurs within the header portion is fixed and may be different that what is illustrated in FIG. 7.

The information comprising a data element descriptor (710, 715) is described in Table 1, below. The data element descriptor information is for use in mapping or converting legacy application input data in a request to a format that a legacy application program expects, and mapping or converting result data from the legacy application program to a format required by a client application.

TABLE 1

| Data Element Descriptor Field | Description |
| --- | --- |
| Level | Relative level of the data field within the COMMAREA description |
| Column Identifier | Identifier of data item. May be overridden by publisher of Web Service |
| Column Type | Indicates whether the column is a group data item or an elementary data item |
| Description | |
| Precision | The field's precision |
| Scale | The field's scale |
| Minimum Occurs Count | Minimum occurrences specified for an occurs array |
| Occurs Count | The maximum number of occurs for an array |
| Displacement | The relative displacement within the COMMAREA for the data element |
| Column Type | Column data type (e.g. character, integer, decimal, numeric, etc.) |
| Parm Type | Input, Output, or Both |
| Initialize Field | Indicates that the publisher wishes that this field be initialized. |
| Occurs Level | Indicates Level of the occurs/array within |

TABLE 1-continued

| Data Element Descriptor Field | Description |
| --- | --- |
| | the COMMAREA (e.g. 1 = one dimensional array, 2 = multidimensional array) |
| Depending on Number | If an array has a depending on field, this number is the number of the column that contains the actual occurrence data |
| Occurs Offset | Total length of a single row of an array |
| Parent Number | If the field is part of a group, this number is the number of the column that contains the identifier of the group |

The items listed in table 1 are for the purpose of illustration and are not intended to be limiting in any way. Those of ordinary skill in the art will recognize that additional information may be used to describe data elements in the COMMAREA. Additionally not all of the items listed are required.

According to one embodiment of the present invention, a request comprises a SOAP request, and a response comprises a SOAP response. These are described in more detail below, with reference to FIGS. 8A and 8B.

The Simple Object Access Protocol (SOAP) specifies a format for messages passed between Web Services. SOAP is described in "SOAP 1.1, W3C Notes 8 May 2000, www.w3.org/TR/2000/NOTE-SOAP-20000508/, and "SOAP Version 1.2 Part 1: Messaging Framework", W3C Recommendation 24 Jun. 2003, www.w3c.org/TR/soap12-part1/.

Turning now to FIG. 8A, a block diagram that illustrates a SOAP request in accordance with one embodiment of the present invention is presented. FIG. 8A corresponds with FIG. 8B. As shown in FIG. 8A, SOAP request 800 comprises a search request for records containing the value "CARD". The XML namespace 810 is described above with reference to FIG. 4.

Turning now to FIG. 8B, a block diagram that illustrates a SOAP response in accordance with one embodiment of the present invention is presented. FIG. 8B corresponds with FIG. 8A. As shown in FIG. 8B, SOAP response 850 comprises the results of a search request for records containing the value "CARD".

Figure 9:
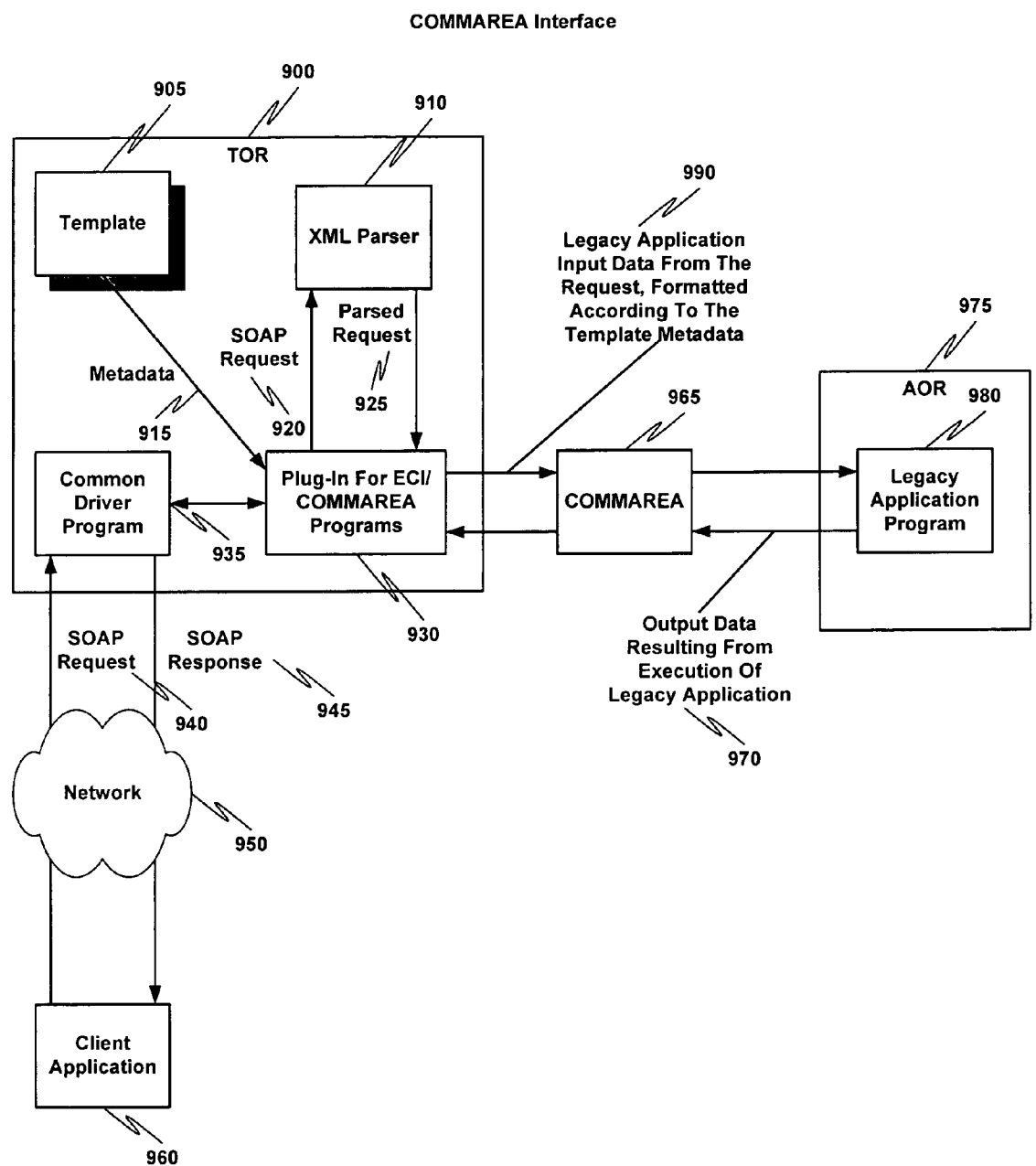
FIG. 9 is a block diagram that illustrates a system for using COMMAREA interface legacy applications as Web Services in accordance with one embodiment of the present invention.

Turning now to FIG. 9, a block diagram that illustrates a system for using COMMAREA interface legacy applications as Web Services in accordance with one embodiment of the present invention is presented. FIG. 9 provides more detail for FIG. 6. As shown in FIG. 9, a Terminal Owning Region (TOR) 900 comprises one or more templates 905, a common driver program 935, an XML parser 910, and a plug-in for ECI/COMMAREA programs. Additionally, an Application Owning Region (AOR) 975 comprises a legacy application program 980. Client application 960 sends a SOAP request 940 to common driver program 935 via network 950. The SOAP request 940 includes legacy application input data qualified by an XML namespace as described above with respect to FIG. 4. Common driver program 935 is configured to receive the SOAP request 940, obtain a template 905 specified in the XML namespace, format the legacy application input data as specified by the template 905, invoke the legacy application program 980 specified in the request 940, receive output data from the legacy application 980, format the output data as specified by the template 905, and return a SOAP response 945 to the client application 960 via network interface 950.

Many other devices or subsystems (not shown) may be connected in a similar manner. Also, it is not necessary for all of the components shown in FIG. 9 to be present to practice the present invention, as discussed below. Furthermore, the components may be interconnected in different ways from that shown in FIG. 9. Code to implement the present invention may be operably disposed in system memory or stored on storage media such as fixed disk, floppy disk, or CD-ROM.

Figure 10:
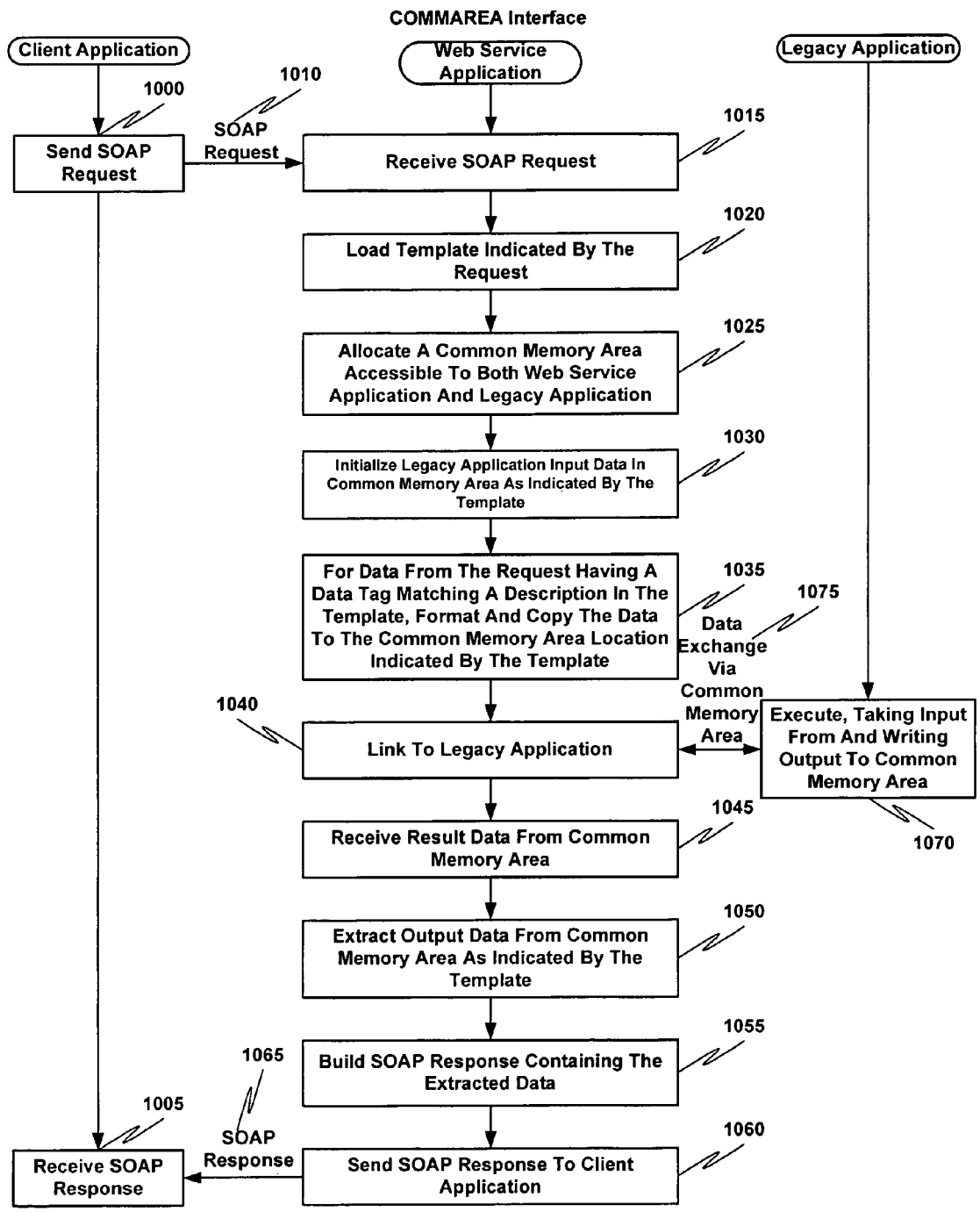
FIG. 10 is a flow diagram that illustrates a method for using COMMAREA interface legacy applications as Web Services in accordance with one embodiment of the present invention.

Turning now to FIG. 10, a flow diagram that illustrates a method for using COMMAREA interface legacy applications as Web Services in accordance with one embodiment of the present invention is presented. FIG. 10 corresponds with FIG. 9. The processes illustrated in FIG. 10 may be implemented in hardware, software, firmware, or a combination thereof. At 1000, a client application sends a SOAP request 1010. At 1015, the Web Service application receives the SOAP request 1010. At 1020, the template indicated by the request 1010 is loaded. At 1025, an area of memory accessible to both the Web Service application and the legacy application is allocated. At 1030, legacy application input data is initialized in the common memory area as indicated by the template. At 1035, data from the XML request 1010 is parsed and the text node from the data tag matching a description in the template is formatted and copied to the common memory area location as indicated by the template. At 1040, a link to the legacy application is performed. At 1070, the legacy application is executed. The legacy application takes input from the common memory area and writes results to the common memory area. At 1045, the Web Service application receives the result data from the common memory area. At 1050, the output data is extracted from the common memory area as indicated by the template and encoded as per XML specifications. At 1060, a SOAP response 1065 is sent to the client application. At 1005, the SOAP response is received by the client application.

Figure 11:
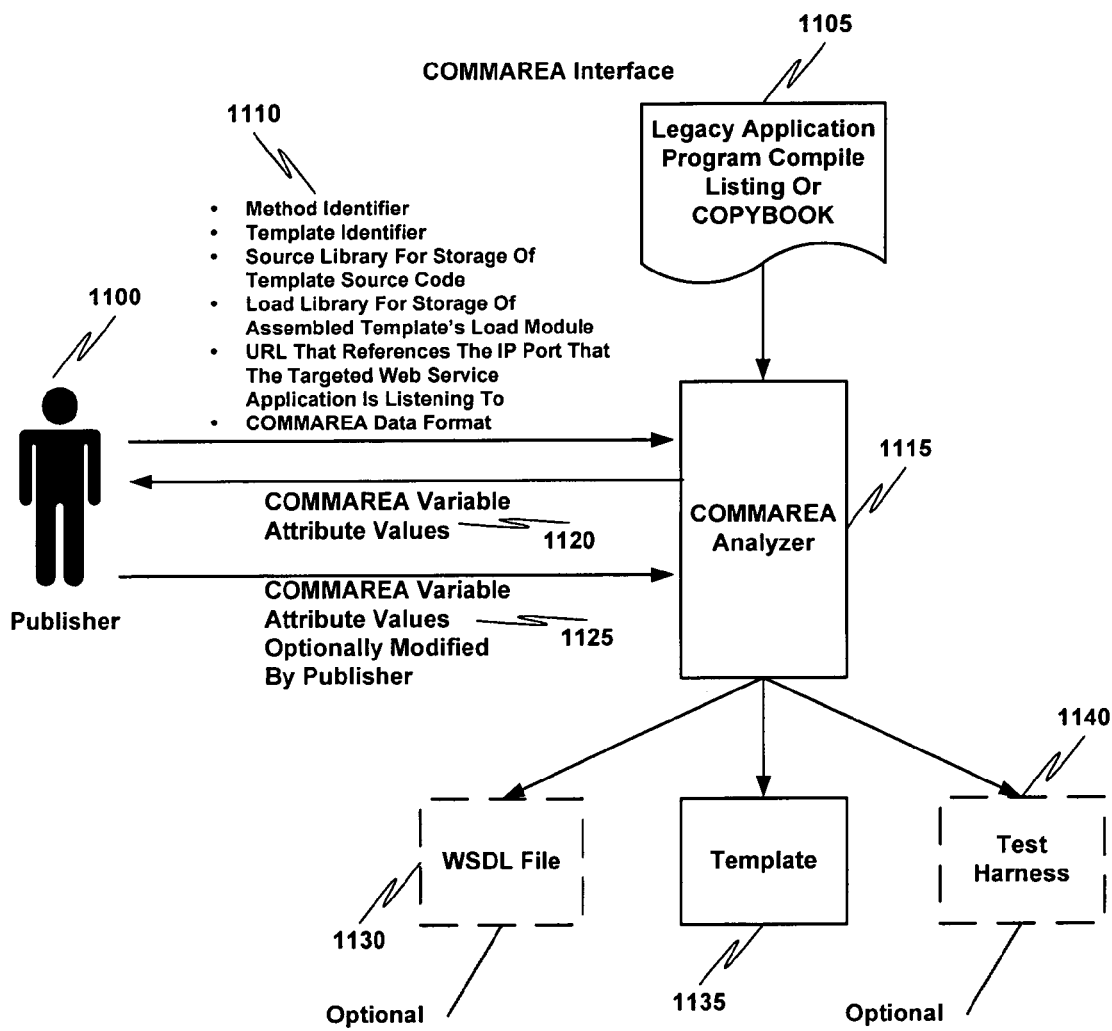
FIG. 11 is a block diagram that illustrates an apparatus for creating a COMMAREA interface template in accordance with one embodiment of the present invention.

Turning now to FIG. 11, a block diagram that illustrates an apparatus for creating a COMMAREA interface template in accordance with one embodiment of the present invention is presented. Template 1135 corresponds with template 905 of FIG. 9. As shown in FIG. 11, a COMMAREA analyzer 1115 receives a legacy application program compile listing or copybook 1105. The analyzer 1115 also receives publisher-supplied information. Using FIG. 11 as an example, the publisher-supplied information may include a method identifier, a template identifier, a source library for storage of an assembled templates' load module, a URL that references the Internet Protocol (IP) port that the targeted Web Service application is listening to, and a COMMAREA data format. The COMMAREA data format may be, by way of example, ASCII or EBCDIC. The analyzer 1115 examines the supplied information to determine one or more COMMAREA variable attribute values 1120, which are presented to the publisher 1100. The publisher may modify the attribute values and return them to the analyzer 1115. The analyzer 1115 produces a template 1135 and optionally produces a Web Services Description Language (WSDL) file 1130, a test harness 1140 for automating testing of template, or both. WSDL is described in "Web Services Description Language (WSDL) 1.1", W3C Note 15 Mar. 2001, www.w3.org/TR/wsdl.

Many other devices or subsystems (not shown) may be connected in a similar manner. Also, it is not necessary for all of the components shown in FIG. 11 to be present to practice the present invention, as discussed below. Furthermore, the components may be interconnected in different ways from that shown in FIG. 11. Code to implement the present invention may be operably disposed in system memory or stored on storage media such as fixed disk, floppy disk, or CD-ROM.

Figure 12:
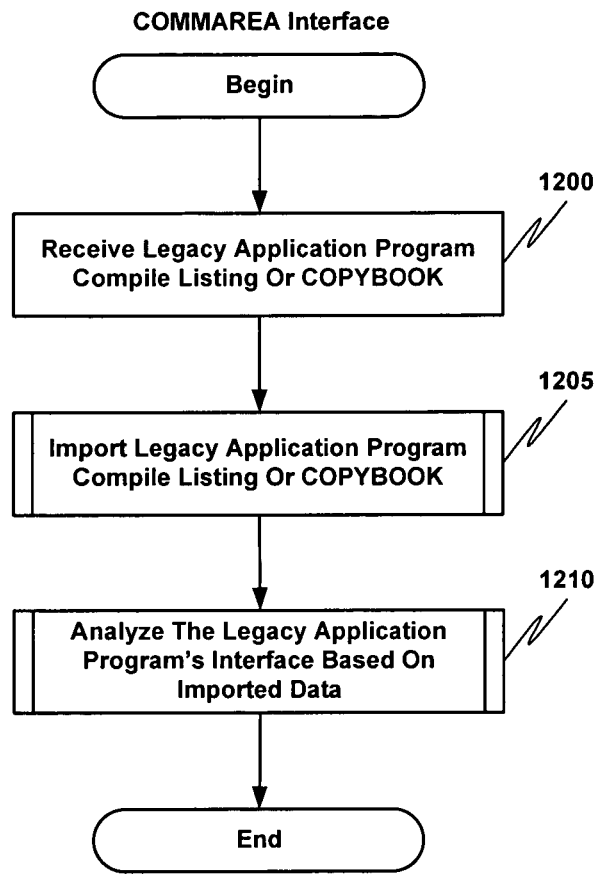
FIG. 12 is a flow diagram that illustrates a method for creating a COMMAREA interface template in accordance with one embodiment of the present invention.

Turning now to FIG. 12, a flow diagram that illustrates a method for creating a COMMAREA interface template in accordance with one embodiment of the present invention is presented. The processes illustrated in FIG. 12 may be implemented in hardware, software, firmware, or a combination thereof. FIG. 12 corresponds with FIG. 11. At 1200, a legacy application program compile listing or copybook is received. At 1205, the legacy application program compile listing or copybook is imported. At 1210, the legacy application program's interface is analyzed based at least in part on the compile listing or copybook.

Turning now to FIG. 13A, a block diagram that illustrates compile parameters for producing a compile listing is presented. FIG. 13A provides more detail for reference numerals 1105 and 1805 of FIGS. 11 and 18, respectively. As shown in FIG. 13A, the compile parameters 1300 indicates the parameters used to compile the associated program. One of the compile parameters, the "LIST" parameter 1305 directs a compiler to produce a compile listing that is used with the Import process of embodiments of the present invention. The List option produces a "Cross-Reference of Data Names" shown in FIG. 13B and a "Data Division Map" shown in FIG. 13C. The Import process uses the "Cross-Reference of Data Names" shown in FIG. 13B and the "Data Division Map" shown in FIG. 13C to determine how individual fields in the COMMAREA are used in the program. List file formats may vary depending upon factors including the particular computer platform, computer language, compiler vendor, and compiler version. Thus, a list file produced by one compiler may describe input and output data differently than a list file produced by another compiler. Thus, according to embodiments of the present invention, compile listing analyzers analyze compile listings based at least in part on the particular compiler that produced the compile listing.

Figure 14:
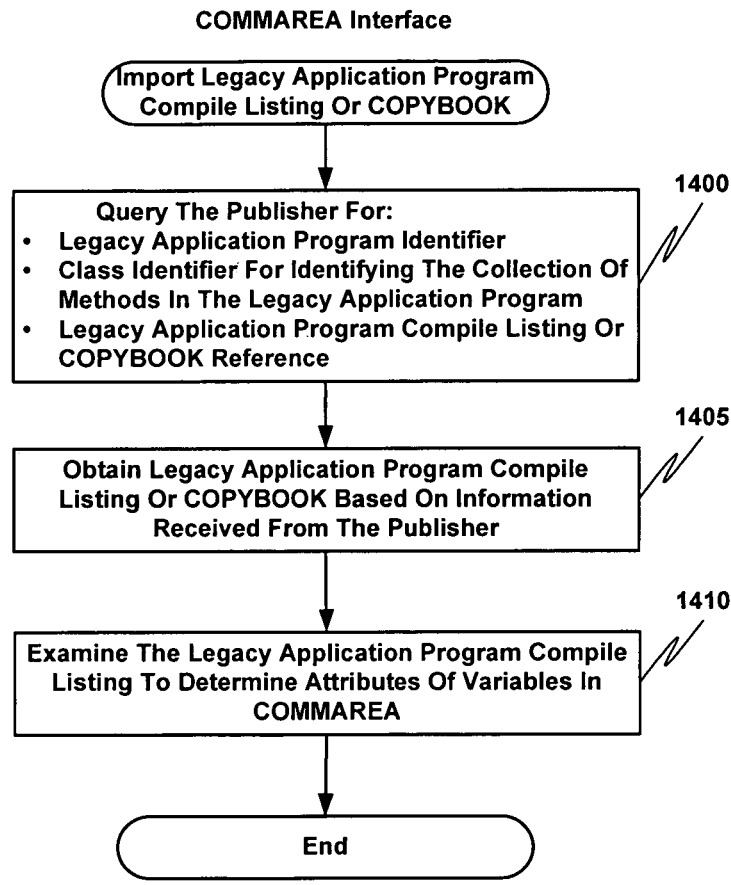
FIG. 14 is a flow diagram that illustrates a method for importing a COMMAREA interface legacy application program compile listing or copybook in accordance with one embodiment of the present invention.

Turning now to FIG. 14, a flow diagram that illustrates a method for importing a COMMAREA interface legacy application program compile listing or copybook in accordance with one embodiment of the present invention is presented. FIG. 14 provides more detail for reference numeral 1205 of FIG. 12. The processes illustrated in FIG. 14 may be implemented in hardware, software, firmware, or a combination thereof. At 1400, the publisher is queried for a legacy application program identifier, a class identifier for identifying the collection of methods in the legacy application program, and a legacy application program compile listing or copybook reference. At 1405, the legacy application program compile listing or copybook specified in process 1400 is obtained. At 1410, the legacy application program compile listing is examined to determine attributes of variables in the COMMAREA.

Figure 15:
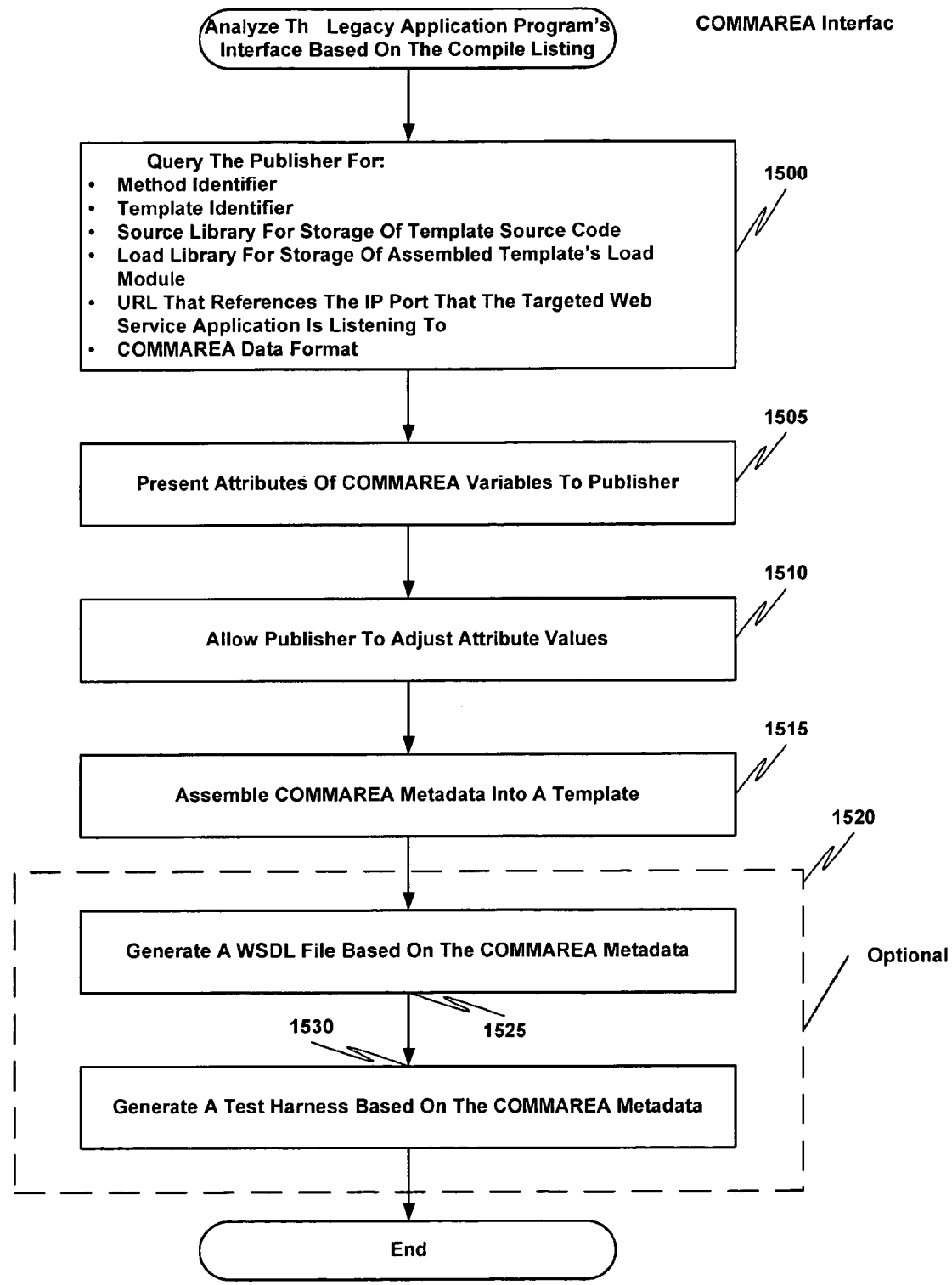
FIG. 15 is a flow diagram that illustrates a method for analyzing a COMMAREA interface legacy application program's interface based on a compile listing in accordance with one embodiment of the present invention.

Turning now to FIG. 15, a flow diagram that illustrates a method for analyzing a COMMAREA interface legacy application program's interface based on a compile listing in accordance with one embodiment of the present invention is presented. FIG. 15 provides more detail for reference numeral 1210 of FIG. 12. The processes illustrated in FIG. 15 may be implemented in hardware, software, firmware, or a combination thereof. At 1500, the publisher is queried for a method identifier, a template identifier, a source library for storage of template source code, a load library for storage of the assembled template's load module, a URL that references the IP port of the targeted Web Service application is listening to, and the COMMAREA data format. The COMMAREA data format may be, by way of example, ASCII or EBCDIC. At 1505, the attributes of the COMMAREA variables are presented to the publisher. At 1510, the publisher is allowed to adjust attribute values. By way of example, a COMMAREA variable identifier may be modified from what was specified in the compile listing or copybook to a variable identifier selected by the publisher. At 1515, the COMMAREA data is assembled into a template. According to one embodiment of the present invention, the template comprises an assembler data-only load module. According to another embodiment of the present invention, the template comprises a DB2 table. Those of ordinary skill in the art will recognize that various storage mediums and storage formats may be used to represent and store the metadata comprising a template.

Still referring to FIG. 15, processes 1525 and 1530 in box 1520 are optional. At 1525, a WSDL file is generated based at least in part on the COMMAREA data. At 1530, a test harness for automating testing of template is generated based at least in part on the COMMAREA data.

While the operations shown in FIG. 15 are illustrated in a specific order, other sequences of the operations are conceivable, for example, operations 1525 and 1530 may be performed in any order with respect to each other.

Figure 16:
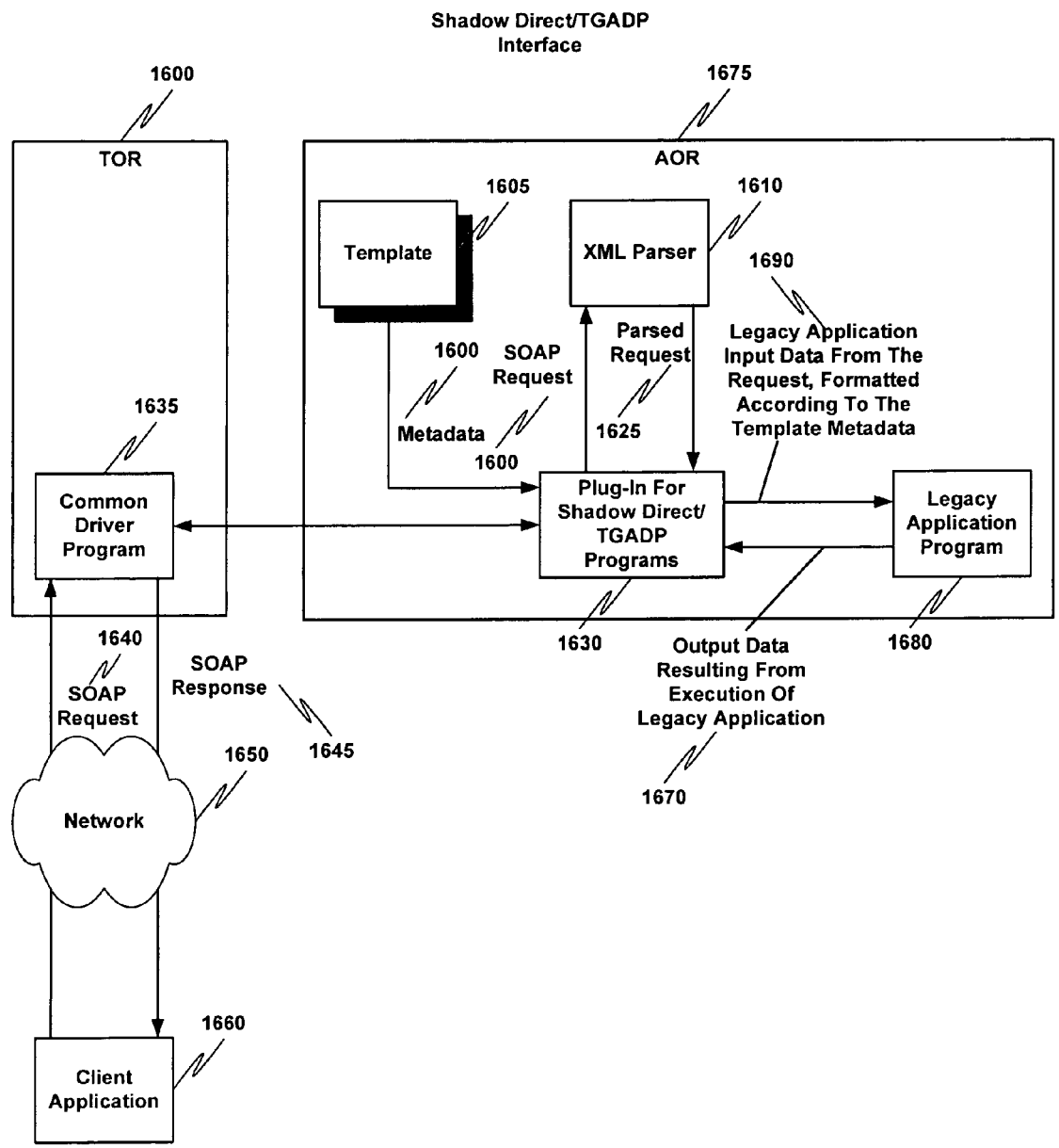
FIG. 16 is a block diagram that illustrates a system for using shadow direct/TGADP interface legacy applications as Web Services in accordance with one embodiment of the present invention.
Figure 17:
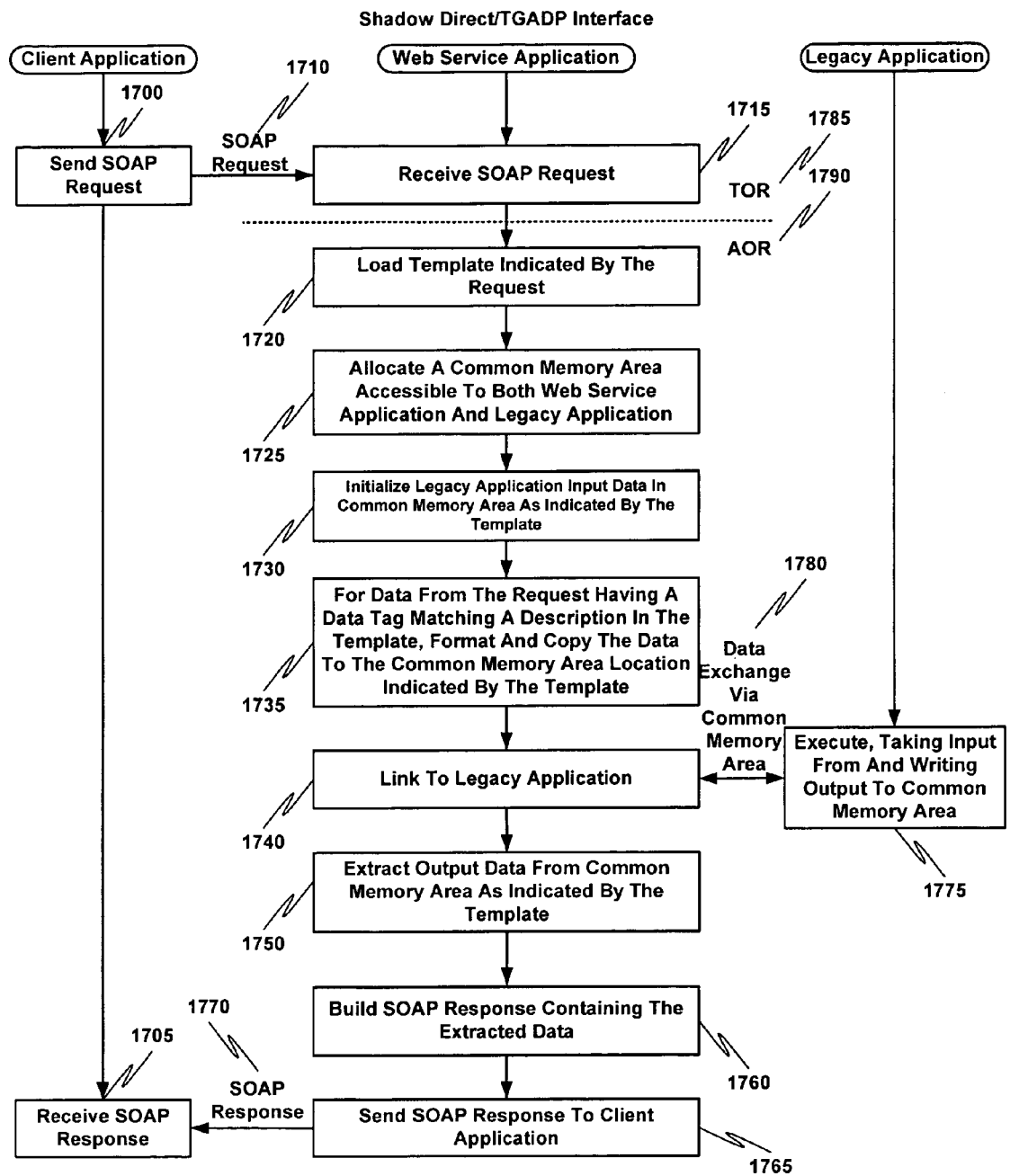
FIG. 17 is a flow diagram that illustrates a method for using shadow direct/TGADP interface legacy applications as Web Services in accordance with one embodiment of the present invention.
Figure 18:
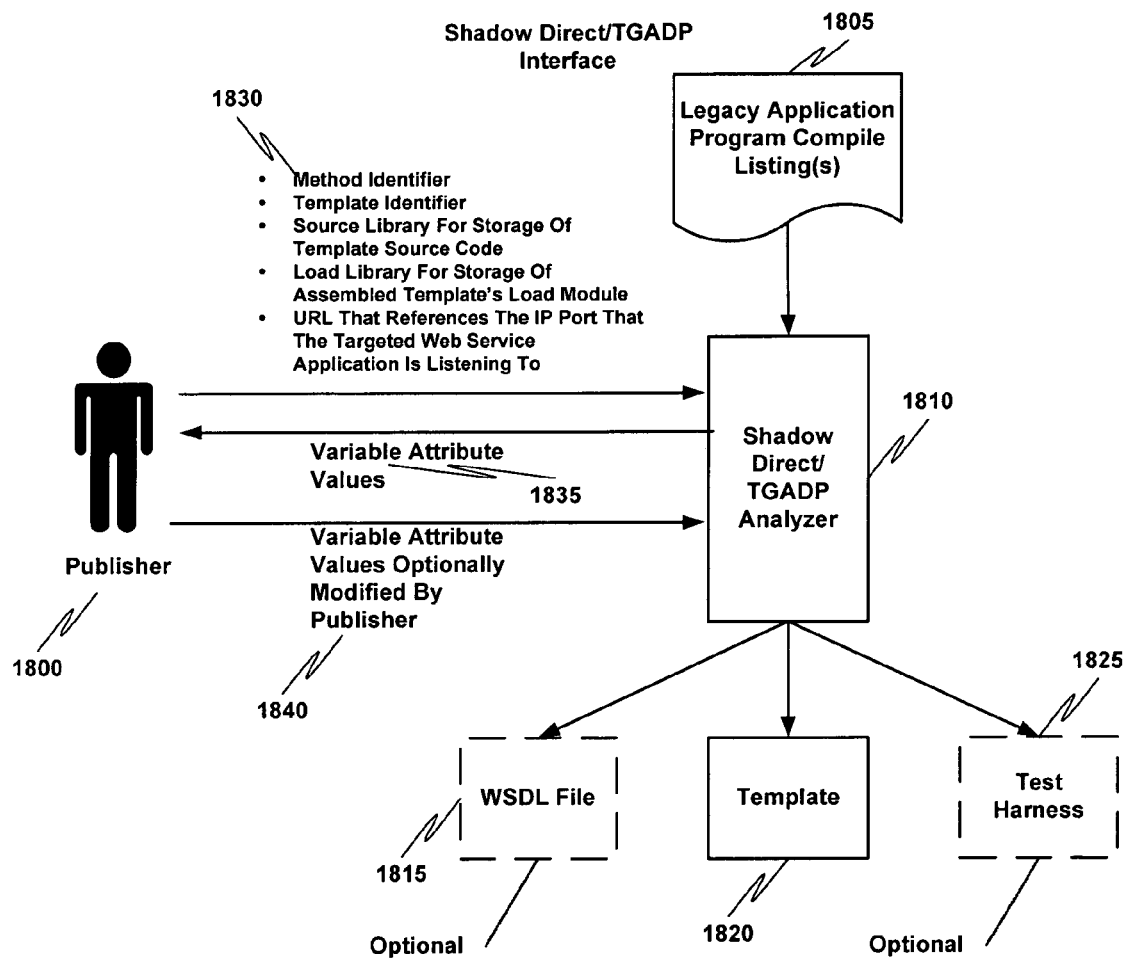
FIG. 18 is a block diagram that illustrates an apparatus for creating a shadow direct/TGADP interface template in accordance with one embodiment of the present invention.
Figure 20:
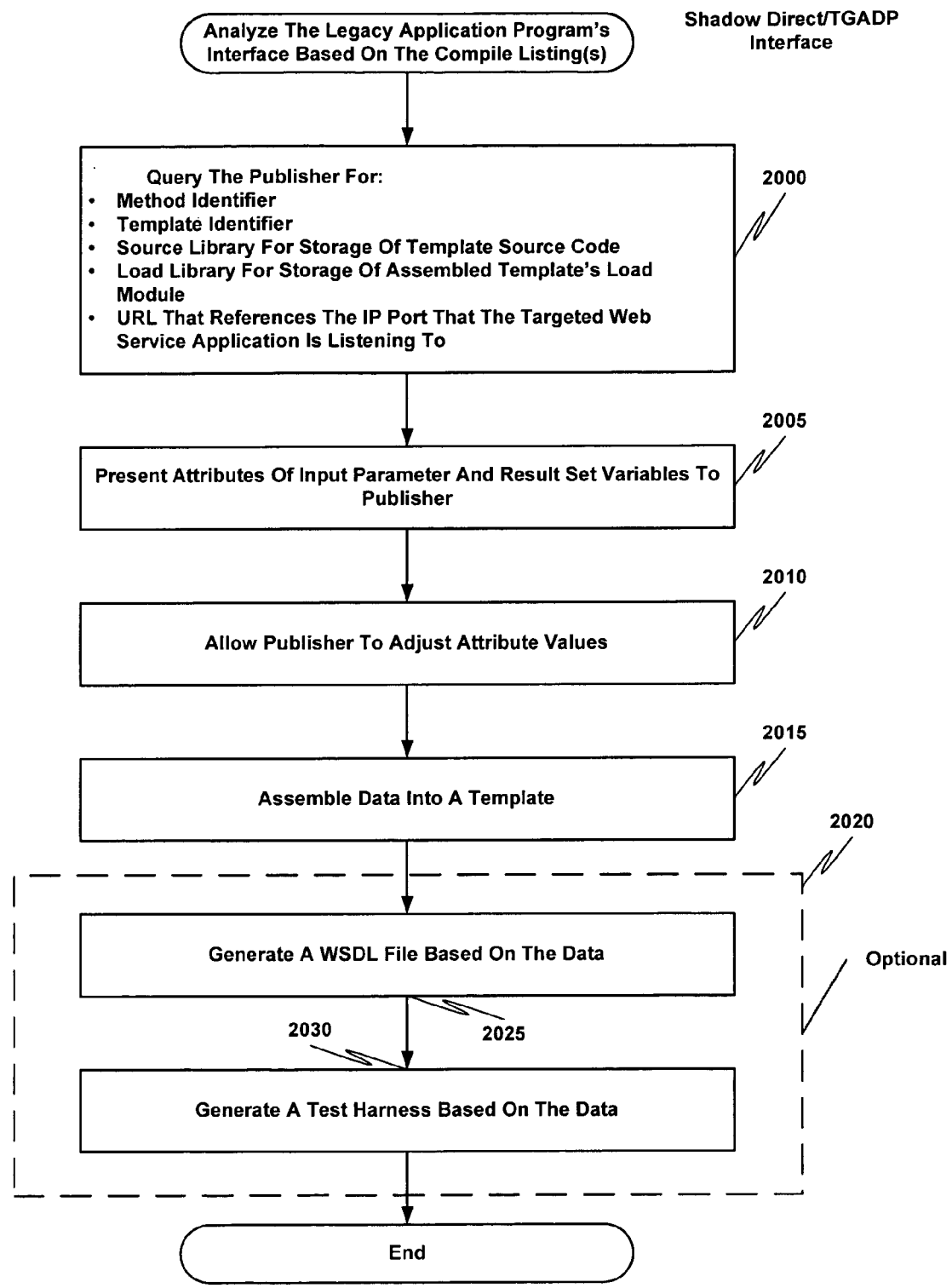
FIG. 20 is a flow diagram that illustrates a method for analyzing a shadow direct/TGADP interface legacy application program's interface based on a compile listing in accordance with one embodiment of the present invention.

FIGS. 16-20 illustrate using shadow direct/TGADP interface legacy applications as Web Services in accordance with one embodiment of the present invention. FIGS. 16-17 illustrate operational aspects of the interface, and FIGS. 18-20 illustrate creating a template for subsequent use in making a legacy application program available as a Web Service.

Shadow direct programs, available from Neon Systems of Sugarland, Tex., are designed to execute in a non-CICS mainframe address space and use a series of ODBC Server APIs to return ODBC result sets. TGADP is a registered trademark of Merrill Lynch & Co., Inc. TGADP programs, described in U.S. Pat. No. 6,473,807, also return ODBC result sets but run in a CICS mainframe address space. According to embodiments of the present invention, both shadow direct programs and TGADP programs run in CICS and are accessed as Web Services.

Turning now to FIG. 16, a block diagram that illustrates a system for using shadow direct/TGADP interface legacy applications as Web Services in accordance with one embodiment of the present invention is presented. As shown in FIG. 16, a TOR 1600 comprises a common driver program 1635. Common driver 1635 is also described above regarding reference numeral 935 of FIG. 9. An AOR 1675 comprises an XML parser 1610, (1610 is also described in reference numeral 910 of FIG. 9) a plug-in for Shadow Ddirect/TGADP programs 1630, one or more templates 1605, a legacy application program 1680. Client application 1660 sends a SOAP request 1640 to common driver program 1635 via network 1650. The SOAP request 1640 includes legacy application input data qualified by an XML namespace. Common driver program 1635 is configured to receive the SOAP request 1640 and send the SOAP request to the plug-in for Shadow Direct/TGADP programs 1630 in the AOR 1675. The plug-in 1630 is configured to obtain a template 1605 specified in the request 1640, format the legacy application input data as specified by the template 1605, invoke the legacy application program 1680 specified in the XML namespace of the request 1640, receive output data from the legacy application 1680, format the output data as specified by the template 1605, and return a response 1645 to the client application 1660 via network interface 1650.

Many other devices or subsystems (not shown) may be connected in a similar manner. Also, it is not necessary for all of the components shown in FIG. 16 to be present to practice the present invention, as discussed below. Furthermore, the components may be interconnected in different ways from that shown in FIG. 16. Code to implement the present invention may be operably disposed in system memory or stored on storage media such as fixed disk, floppy disk, or CD-ROM.

Turning now to FIG. 17, a flow diagram that illustrates a method for using shadow direct/TGADP interface legacy applications as Web Services in accordance with one embodiment of the present invention is presented. FIG. 17 corresponds with FIG. 16. The processes illustrated in FIG. 17 may be implemented in hardware, software, firmware, or a combination thereof. At 1700, a client application sends a SOAP request 1710. At 1715, the Web Service application resident in the TOR receives the SOAP request 1710 and transfers the request 1710 to the Web Service application in the AOR. At 1720, the template indicated by the request 1710 is loaded. At 1725, an area of memory accessible to both the Web Service application and the legacy application is allocated. At 1730, legacy application input data is initialized in the common memory area as indicated by the template. At 1735, data from the XML request 1710 having a data tag matching a description in the template is formatted and copied to the common memory area location indicated by the template. At 1740, a link to the legacy application is performed. At 1775, the legacy application is executed. The legacy application uses the Shadow Direct/TGADP API set, which retrieves the input from the common memory area and writes results to the common memory area as a SOAP response in accordance with the template. At 1760, a SOAP response is finalized and at 1765 it is sent to the client application. At 1705, the SOAP response is received by the client application.

Turning now to FIG. 18, a block diagram that illustrates an apparatus for creating a shadow direct/TGADP interface template in accordance with one embodiment of the present invention is presented. Template 1820 corresponds with template 1600 of FIG. 16. As shown in FIG. 11, a shadow direct/TGADP analyzer 1810 receives one or more legacy application program compile listings 1805. The analyzer 1810 also receives publisher-supplied information. Using FIG. 18 as an example, the publisher-supplied information may include a method identifier, a template identifier, a source library for storage of an assembled templates' load module, a URL that references the IP port that the targeted Web Service application is listening to. The analyzer 1810 examines the supplied information to determine one or more shadow direct/TGADP variable attribute values 1835, which are presented to the publisher 1800. The publisher may modify the attribute values 1840 and return them to the analyzer 1810. The analyzer 1810 produces a template 1820 and optionally produces a WSDL file, 1815, a test harness for automating testing of template 1825, or both.

Many other devices or subsystems (not shown) may be connected in a similar manner. Also, it is not necessary for all of the components shown in FIG. 18 to be present to practice the present invention, as discussed below. Furthermore, the components may be interconnected in different ways from that shown in FIG. 18. Code to implement the present invention may be operably disposed in system memory or stored on storage media such as fixed disk, floppy disk, or CD-ROM.

Turning now to FIG. 19A, a flow diagram that illustrates a method for creating a Shadow Direct/TGADP interface template in accordance with one embodiment of the present invention is presented. The process illustrated in FIG. 19A may be implemented in hardware, software, firmware, or a combination thereof. FIG. 19A corresponds with FIG. 18. At 1900, one or more legacy application program compile listings are received. At 1905, the legacy application program compile listings are imported. At 1910, the legacy application program's interface is analyzed based at least in part on the received compile listings.

Turning now to FIG. 19B, a flow diagram that illustrates a method for importing one or more shadow direct/TGADP interface legacy application program compile listings in accordance with one embodiment of the present invention is presented. FIG. 19B corresponds with FIG. 18 and provides more detail for reference numeral 1810 of FIG. 18. The processes illustrated in FIG. 19B may be implemented in hardware, software, firmware, or a combination thereof. At 1920, the publisher is queried for a legacy application program identifier, a class identifier for identifying the collection of methods in the legacy application program, and one or more legacy application program compile listings. At 1925, the legacy application program compile listing specified in process 1920 is obtained. At 1930, the legacy application program compile listing is examined to determine attributes of variables in the input/output parameters and the result sets.

Turning now to FIG. 20, a flow diagram that illustrates a method for analyzing a shadow direct/TGADP interface legacy application program's interface based on one or more compile listings in accordance with one embodiment of the present invention is presented. FIG. 20 corresponds with FIG. 18 and provides more detail for reference numeral 1210 of FIG. 12. The processes illustrated in FIG. 20 may be implemented in hardware, software, firmware, or a combination thereof. At 2000, the publisher is queried for a method identifier, a template identifier, a source library for storage of template source code, a load library for storage of the assembled template's load module, a and URL that references the IP port of the targeted Web Service application is listening to. At 2005, the attributes of the variables are presented to the publisher. At 2010, the publisher is allowed to adjust attribute values. By way of example, a variable identifier may be modified from what was specified in the compile listing to a variable identifier selected by the publisher. At 2015, the data is assembled into a template. According to one embodiment of the present invention, the template comprises an assembler data-only load module. According to another embodiment of the present invention, the template comprises a DB2 table. Those of ordinary skill in the art will recognize that various storage mediums and storage formats may be used to represent and store the metadata comprising a template.

Still referring to FIG. 20, processes 2025 and 2030 in box 2020 are optional. At 2025, a WSDL file is generated based at least in part on the data. At 2030, a test harness for automating testing of template is generated based at least in part on the data.

While the operations shown in FIG. 20 are illustrated in a specific order, other sequences of the operations are conceivable, for example, operations 2025 and 2030 may be performed in any order with respect to each other.

Figure 21:
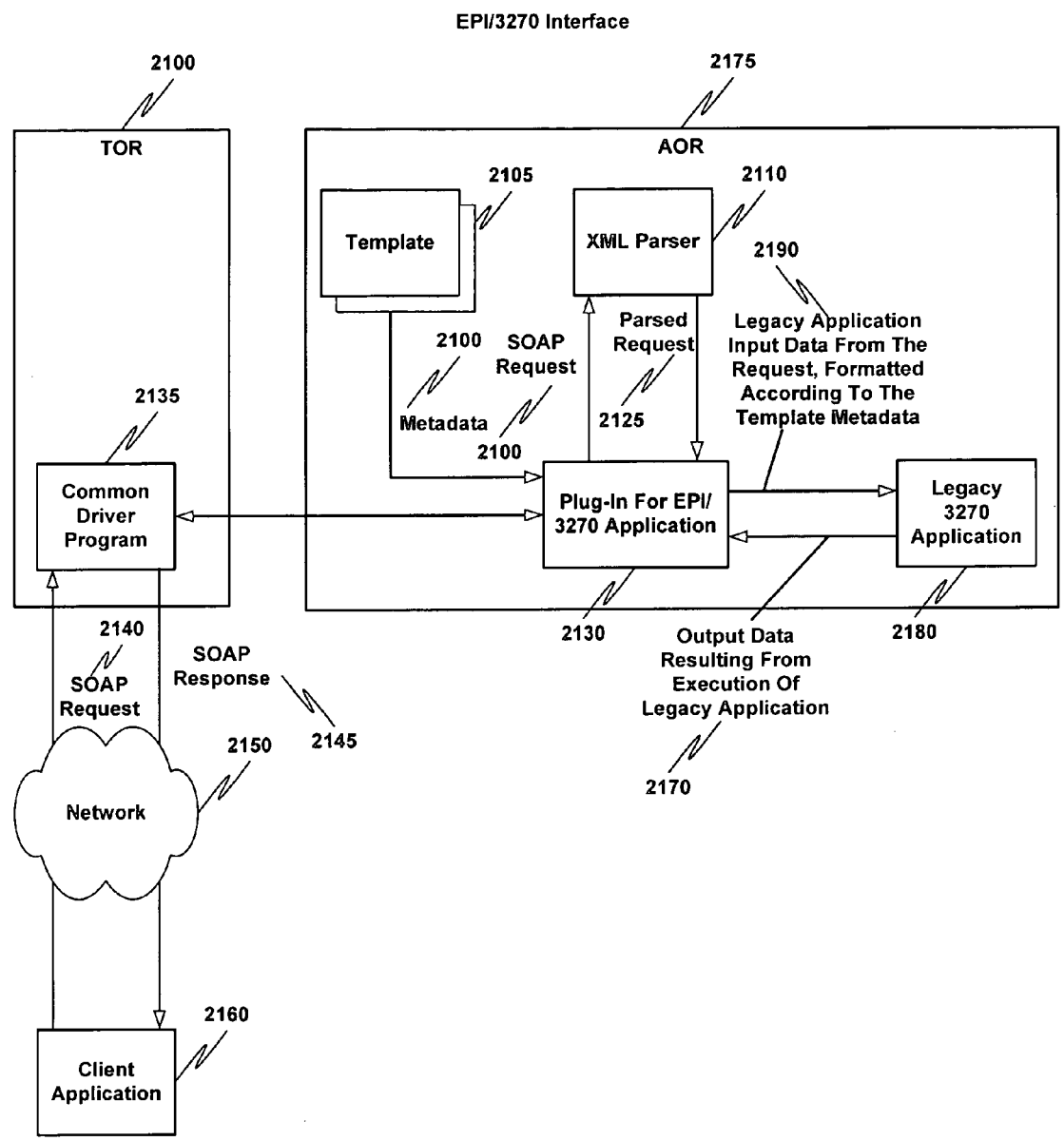
FIG. 21 is a block diagram that illustrates a system for using EPI/3270 interface legacy applications as Web Services in accordance with one embodiment of the present invention.
Figure 22:
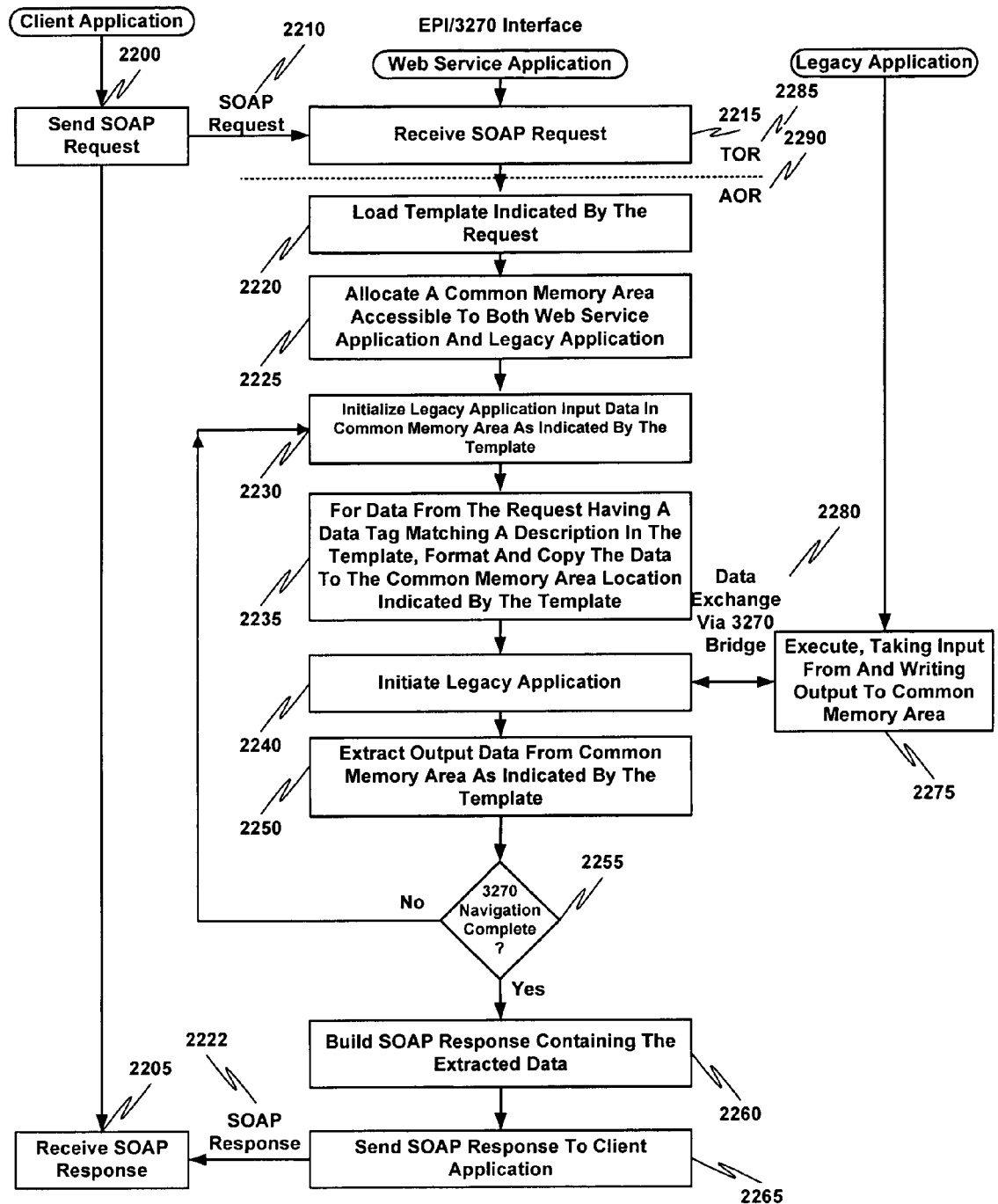
FIG. 22 is a flow diagram that illustrates a method for using EPI/3270 interface legacy applications as Web Services in accordance with one embodiment of the present invention.

FIGS. 21-27 illustrate using EPI/3270 interface legacy applications as Web Services in accordance with one embodiment of the present invention. FIGS. 21-22 illustrate operational aspects of the interface and FIGS. 23-27 illustrate creating a template for subsequent use in making a legacy application available as a Web Service. An External Program Interface (EPI) program is a CICS program that communicates directly with an end user through the use of a 3270 (dumb terminal) data stream, Basic Mapping Support (BMS) maps, or both.

Turning now to FIG. 21, a block diagram that illustrates a system for using EPI/3270 interface legacy applications as Web Services in accordance with one embodiment of the present invention is presented. As shown in FIG. 21, a TOR 2100 comprises a common driver program 2135. 2135 is also described in reference numeral 935 of FIG. 9 and 1635 of FIG. 16. An AOR 2175 comprises an XML parser 2110, (2110 is also described in reference numeral 910 of FIG. 9 and 1610 of FIG. 16) a plug-in for EPI/3270 Interface 2130, one or more templates 2105, a legacy application 2180 (containing one or more programs). Client application 2160 sends a SOAP request 2140 to common driver program 2135 via network 2150. The SOAP request 2140 includes legacy application input data qualified by an XML namespace (as referenced in FIG. 4). Common driver program 2135 is configured to receive the SOAP request 2140 and send the SOAP request to the plug-in for EPI 3270 interface 2130 in the AOR 2175. The plug-in 2130 is configured to obtain a template 2105 specified in the XML namespace of request 2140, format the legacy application input data as specified in the template 2105, invoke the legacy application program 1680 in a loop as per navigation instructions specified in template 2105, receive output data from various executions of the legacy application 2180, format the output data as specified by the template 2105, and return a response 2145 to the client application 2160 via network interface 2150.

Many other devices or subsystems (not shown) may be connected in a similar manner. Also, it is not necessary for all the components shown in FIG. 21 to be present to practice the present invention, as discussed below. Furthermore, the components may be interconnected in different ways from that shown in FIG. 21. Code to implement the present invention may be operably disposed in system memory or stored in media such as fixed disk, floppy disk, or CD-ROM.

Turning now to FIG. 22, a flow diagram that illustrates a method for using EPI/3270 interface legacy applications as Web Services in accordance with one embodiment of the present invention is presented. FIG. 22 corresponds with FIG. 21. The processes illustrated in FIG. 22 may be implemented in hardware, software, firmware, or a combination thereof. At 2200, a client application sends a SOAP request 2210. At 2215, the Web Service application resident in the TOR receives the SOAP request 2210 and transfers the request 2210 to the Web Service application in the AOR. At 2220, the template indicated by the request 2210 is loaded. At 2225, an area of memory accessible to both the Web Service application and the legacy application is allocated. At 2230, legacy application input data is initialized in the common memory area as indicated by the template. At 2235, for data from the XML request 2210 having a data tag matching a description in the template, the data is formatted and copied to the common memory area location indicated by the template. At 2240, a link to the legacy application is performed. At 2275, the legacy application is executed via 3270 bridge. The legacy application uses the 3270 command to receive and send data, which retrieves the input from and writes output to common memory area. At 2250, the output parameter data is extracted from the common memory area as indicated by the template. At 2255, template is used to ascertain navigation pattern and end of navigation. If navigation is not complete then flow is transferred back to 2230 to initialize input data and repeat the same process of 2235, 2240, executing legacy 2275 and 2250. If no more navigation is needed then control is transferred to 2260. At 2260, a SOAP response is finalized and at 2265 it is sent to the client application. At 2205, the SOAP response is received by the client application.

Figure 23:
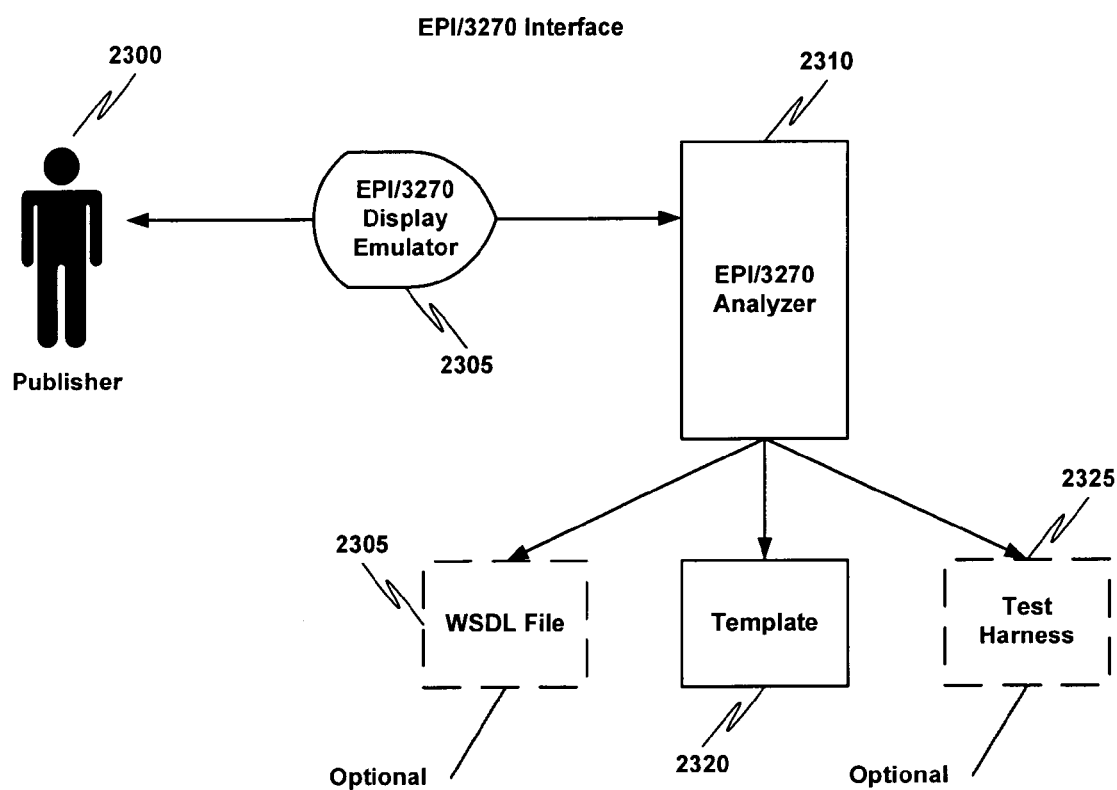
FIG. 23 is a block diagram that illustrates an apparatus for creating an EPI/3270 interface template in accordance with one embodiment of the present invention.

Turning now to FIG. 23, a block diagram that illustrates an apparatus for creating an EPI/3270 interface template in accordance with one embodiment of the present invention is presented. As shown in FIG. 23, a publisher 2300 interfaces with an EPI/3270 display emulator. An analyzer 2310 analyzes the legacy application program's interface based at least in part on the publisher's interactions with the EPI/3270 display emulator 2305. The analyzer 2310 produces a template 2320 and optionally produces a WSDL file 2305, a test harness 2325 for automating testing of template, or both.

Many other devices or subsystems (not shown) may be connected in a similar manner. Also, it is not necessary for all of the components shown in FIG. 23 to be present to practice the present invention, as discussed below. Furthermore, the components may be interconnected in different ways from that shown in FIG. 23. Code to implement the present invention may be operably disposed in system memory or stored on storage media such as fixed disk, floppy disk, or CD-ROM.

Figure 24:
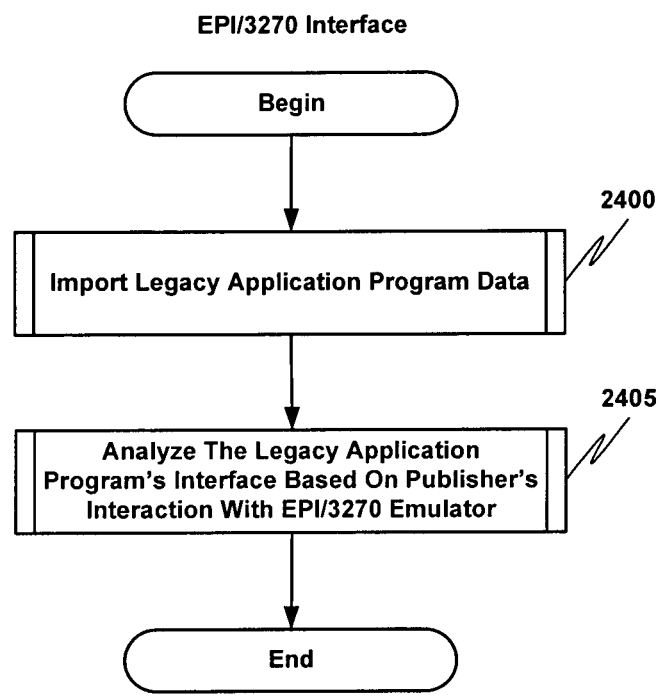
FIG. 24 is a flow diagram that illustrates a method for importing and analyzing an EPI/3270 interface legacy application program's interface based on a compile listing in accordance with one embodiment of the present invention.

Turning now to FIG. 24, a flow diagram that illustrates a method for importing and analyzing an EPI/3270 interface legacy application program's interface based on a publisher's interaction during 3270 emulation in accordance with one embodiment of the present invention is presented. FIG. 24 corresponds with FIG. 23. The processes illustrated in FIG. 24 may be implemented in hardware, software, firmware, or a combination thereof. At 2400, legacy application program data is imported. At 2405, the legacy application program's interface is analyzed based at least in part on the publisher's interaction with an EPI/3270 display emulator.

Figure 25:
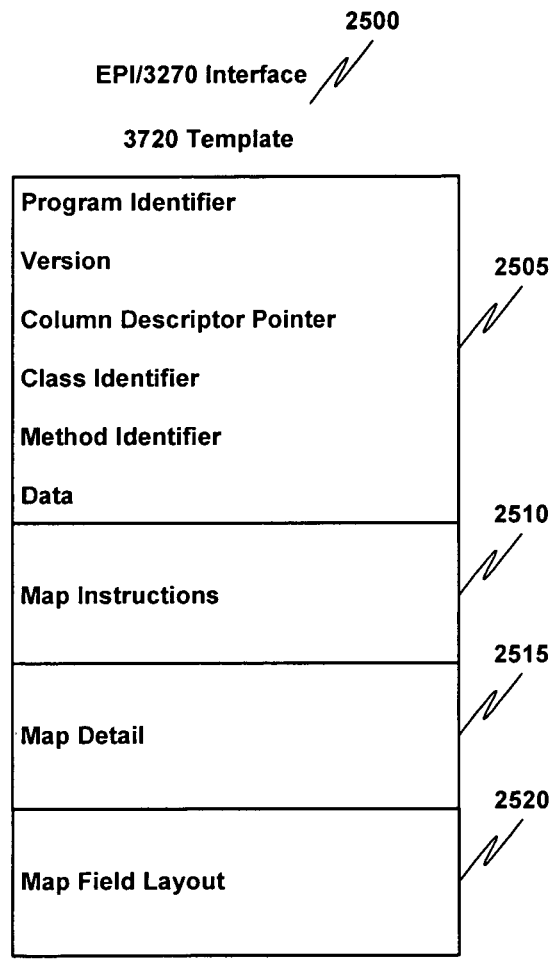
FIG. 25 is a block diagram that illustrates an EPI/3270 interface template in accordance with one embodiment of the present invention.

Turning now to FIG. 25, a block diagram that illustrates an EPI/3270 interface template in accordance with one embodiment of the present invention is presented. Template 2500 provides more detail for template 2320 of FIG. 23. As shown in FIG. 25, template 2500 comprises a header portion, 2505, map instructions 2510, map detail 2515, and map field layout 2520.

Figure 26:
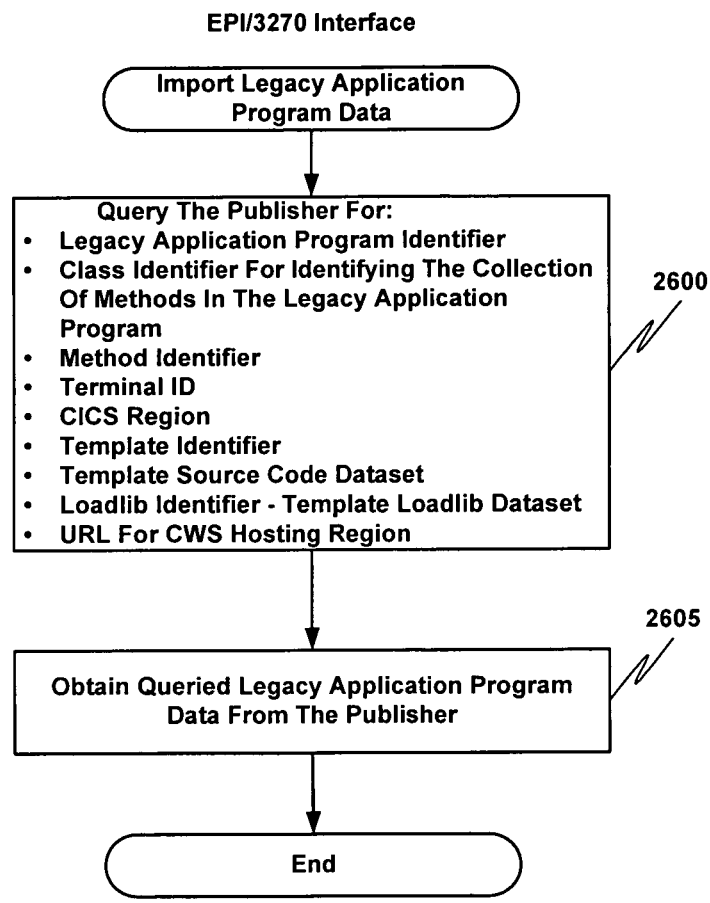
FIG. 26 is a flow diagram that illustrates a method for importing EPI/3270 interface legacy application program data in accordance with one embodiment of the present invention.

Turning now to FIG. 26, a flow diagram that illustrates a method for importing EPI/3270 interface legacy application program data in accordance with one embodiment of the present invention is presented. FIG. 26 provides more detail for reference numeral 2400 of FIG. 24. The processes illustrated in FIG. 26 may be implemented in hardware, software, firmware, or a combination thereof. At 2600, the publisher is queried for the following information:

Legacy application program identifier
Class identifier for identifying the collection of methods in the legacy application program
Method identifier
Terminal ID (if the transactions depend upon a particular terminal)
CICS region where the 3270 transaction executes
Template identifier
Template source code dataset
URL for CWS hosting region At 2605, the queried legacy application program data is obtained from the publisher.

Figure 27:
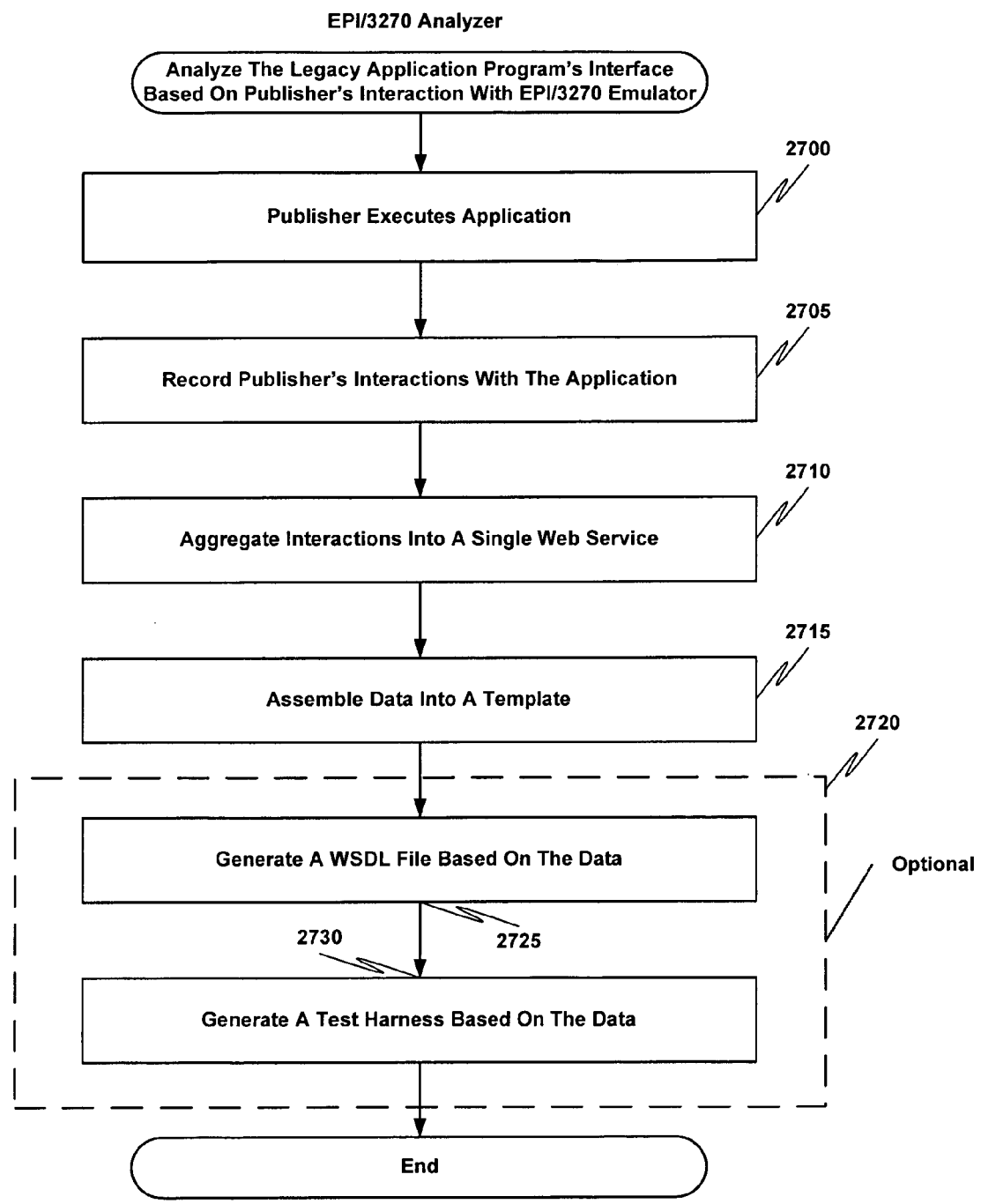
FIG. 27 is a flow diagram that illustrates a method for analyzing an EPI/3270 interface program's interface based upon a publisher's interaction with an EPI/3270 emulator in accordance with one embodiment of the present invention.

Turning now to FIG. 27, a flow diagram that illustrates a method for analyzing an EPI/3270 interface program's interface based upon a publisher's interaction with an EPI/3270 emulator in accordance with one embodiment of the present invention is presented. FIG. 27 provides more detail for reference numeral 2405 of FIG. 24. The processes illustrated in FIG. 27 may be implemented in hardware, software, firmware, or a combination thereof. At 2700, the publisher executes the legacy application. At 2705, the publisher's interactions with the application are recorded. At 2710, the publisher's interactions with the application are aggregated into a single Web Service. At 2715, the data is assembled into a template. According to one embodiment of the present invention, the template comprises an assembler data-only load module. According to another embodiment of the present invention, the template comprises a DB2 table. Those of ordinary skill in the art will recognize that various storage mediums and storage formats may be used to represent and store the metadata comprising a template.

Still referring to FIG. 27, processes 2727 and 2730 in box 2720 are optional. At 2725, a WSDL file is generated based at least in part on the data aggregated in 2715. At 2550, a test harness for automating testing of template is generated based at least in part on the data aggregated in 2715.

While the operations shown in FIG. 27 are illustrated in a specific order, other sequences of the operations are conceivable, for example, operations 2725 and 2730 may be performed in any order with respect to each other.

A stored procedure is a set of Structured Query Language (SQL) statements that are stored under a procedure identifier so that the statements can be executed as a group by a database server. In DB2, a "SYSIBM.SYSPARMS" table contains a description of input parameters for stored procedures. Additionally, a cursor is a named control structure used by an application program to point to a specific row within an ordered set of rows. The cursor is used to retrieve rows from a set. FIGS. 28 and 29 illustrate using stored procedure interface legacy applications as Web Services in accordance with one embodiment of the present invention. FIGS. 28 and 29 illustrate operational aspects of the interface.

Turning now to FIG. 28, a block diagram that illustrates a system for using stored procedure interface legacy applications as Web Services in accordance with one embodiment of the present invention is presented. As shown in FIG. 28, a client application 2800 is in communication with a server 2810 via network 2805. Server 2810 comprises a network interface 2815, a common driver 2820, one or more table comprising metadata 2825, one or more stored procedure interface plug-ins 2830, and one or more stored procedure legacy applications 2835. Network interface 2815 is configured to handle communications between the client application 2800 and common driver 2820 of server 2810. Common driver 2820 is configured to receive a request 2850 from client application 2800 via network interface 2815, obtain a table 2825 specified in the request 2850, and pass control to an interface plug-in 2830 specified in the request 2850. The one or more tables 2825 comprise metadata regarding legacy application input data and output data for the one or more stored procedure legacy applications 2835. The one or more interface plug-ins 2830 are configured to receive the table 2825 and request data received by the common driver 2830, format legacy application input data from the request 2850 as specified by the table 2825, invoke the stored procedure legacy application 2835, format output data as specified by the template 2825, and return a reply message 2855 containing the output data. Common driver 2820 is further configured to return a response to 2855 the client application 2800 via network interface 2815.

Many other devices or subsystems (not shown) may be connected in a similar manner. Also, it is not necessary for all of the components shown in FIG. 28 to be present to practice the present invention, as discussed below. Furthermore, the components may be interconnected in different ways from that shown in FIG. 28. Code to implement the present invention may be operably disposed in system memory or stored on storage media such as fixed disk, floppy disk, or CD-ROM.

According to one embodiment of the present invention, network interface 2815 comprises a listener configured to listen to or monitor network communications and to invoke the common driver 2820 upon detecting a communication targeted to the common driver 2820.

According to one embodiment of the present invention, request 2850 comprises an HTTP request and response 2855 comprises an HTTP response. According to another embodiment of the present invention, request 2850 comprises an MQ request and response 2855 comprises an MQ response. Those of ordinary skill in the art will recognize that other request/response protocols may be used.

Turning now to FIG. 29, a flow diagram that illustrates a method for using stored procedure interface legacy applications as Web Services in accordance with one embodiment of the present invention is presented. FIG. 29 corresponds with FIG. 28. The processes illustrated in FIG. 29 may be implemented in hardware, software, firmware, or a combination thereof. At 2900, a client application sends a SOAP request 2910. At 2915, the Web Service application receives the SOAP request 2910. At 2920, the SYSIBM.SYSPARMS table is queried to obtain rows that describe input and output parameters for the stored procedure. At 2925, data is captured for each parameter from the SOAP request. At 2930, the data is put into native format. At 2935, an SQL Descriptor Area (SQLDA) is built for execution of the request. At 2940, execution of the stored procedure is initiated. At 2945, the stored procedure is executed, taking input from and writing output to the SQLDA. At 2945, attributes of the stored procedure's output is described in an SQLDA. At 2950, pointers are established for each result set. At 2955, for each result set, the "Allocate Cursor" command in DB2 is used to create a cursor for fetching output of the stored procedure. At 2960, data from the cursor is fetched, required type conversions are performed, and the required SOAP response 2965 is sent to the client application. At 2905, the SOAP response 2965 is received by the client application.

FIGS. 30 and 31 illustrate using dynamic SQL statements as Web Services in accordance with one embodiment of the present invention. FIGS. 30 and 31 illustrate operational aspects of the interface.

Turning now to FIG. 30, a block diagram that illustrates a system for executing dynamic SQL queries against mainframe DB2 as Web Services in accordance with one embodiment of the present invention is presented. As shown in FIG. 30, a client application 3000 is in communication with a server 3010 via network 3005. Server 3010 comprises a network interface 3015, a common driver 3020, one or more dynamic SQL interface plug-ins 3030, and one or more legacy databases 3035. Network interface 3015 is configured to handle communications between the client application 3000 and common driver 3020 of server 3010. Common driver 3020 is configured to receive a request 3050 from client application 3000 via network interface 3015 and pass control to an interface plug-in 3030 specified in the request 3050. The one or more interface plug-ins 3030 are configured to receive the dynamic SQL query request data received by the common driver 3030, and execute the dynamic SQL against the legacy database 3035, format the SQL result data as a SOAP response, and return a reply message 3055 containing the SQL result data. Common driver 3020 is further configured to return a response 3055 to the client application 3000 via network interface 3015.

Many other devices or subsystems (not shown) may be connected in a similar manner. Also, it is not necessary for all of the components shown in FIG. 30 to be present to practice the present invention, as discussed below. Furthermore, the components may be interconnected in different ways from that shown in FIG. 30. Code to implement the present invention may be operably disposed in system memory or stored on storage media such as fixed disk, floppy disk, or CD-ROM.

According to one embodiment of the present invention, network interface 3015 comprises a listener configured to listen to or monitor network communications and to invoke the common driver 3020 upon detecting a communication targeted to the common driver 3020.

According to one embodiment of the present invention, request 250 comprises an HTTP request and response 3055 comprises an HTTP response. According to another embodiment of the present invention, request 3050 comprises an MQ request and response 3055 comprises an MQ response. Those of ordinary skill in the art will recognize that other request/response protocols may be used.

Turning now to FIG. 31, a flow diagram that illustrates a method for executing dynamic SQL queries against mainframe DB2 as Web Services in accordance with one embodiment of the present invention is presented. FIG. 31 corresponds with FIG. 30. The processes illustrated in FIG. 31 may be implemented in hardware, software, firmware, or a combination thereof. At 3100, a client application sends a SOAP request 3105. At 3110, the Web Service application receives the SOAP request 3105. At 3115, the SQL query is retrieved from the SOAP request. At 3120, an SQLDA describing the query's output result set is built. At 3125, the cursor for the result set is opened. At 3130, data from the cursor is fetched. At 3140, the data is sent. At 3145, required type conversions are performed and the required SOAP response 3150 is sent to the client application. At 3155, the SOAP response 3150 is received by the client application.

Figure 32:
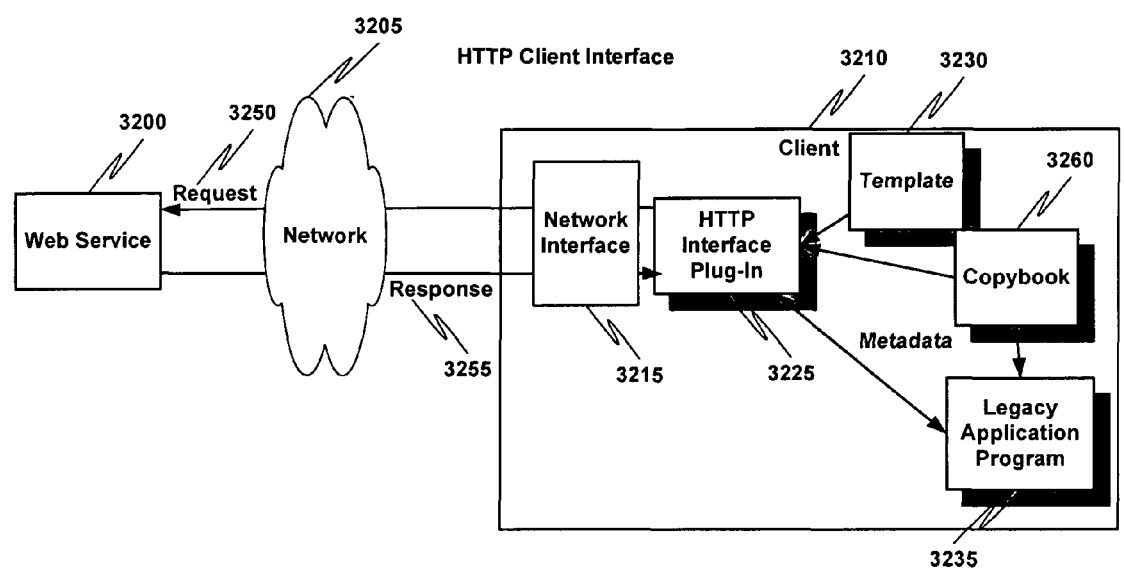
FIG. 32 is a block diagram that illustrates a system for enabling a legacy application program to execute a Web Service via a callable interface in accordance with one embodiment of the present invention.
Figure 33:
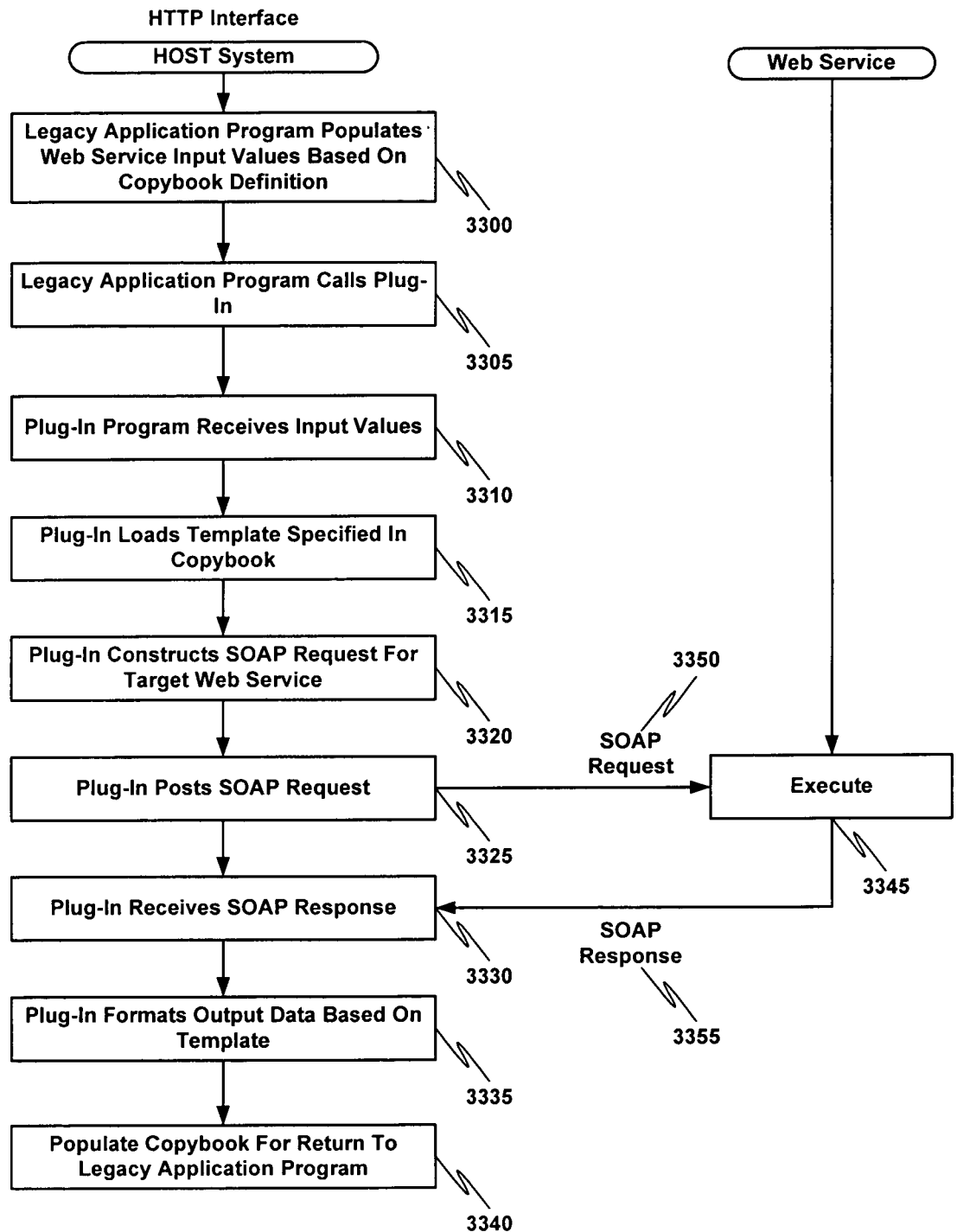
FIG. 33 is a flow diagram that illustrates a method for enabling a legacy application program to execute a Web Service via a callable interface in accordance with one embodiment of the present invention.
Figure 34:
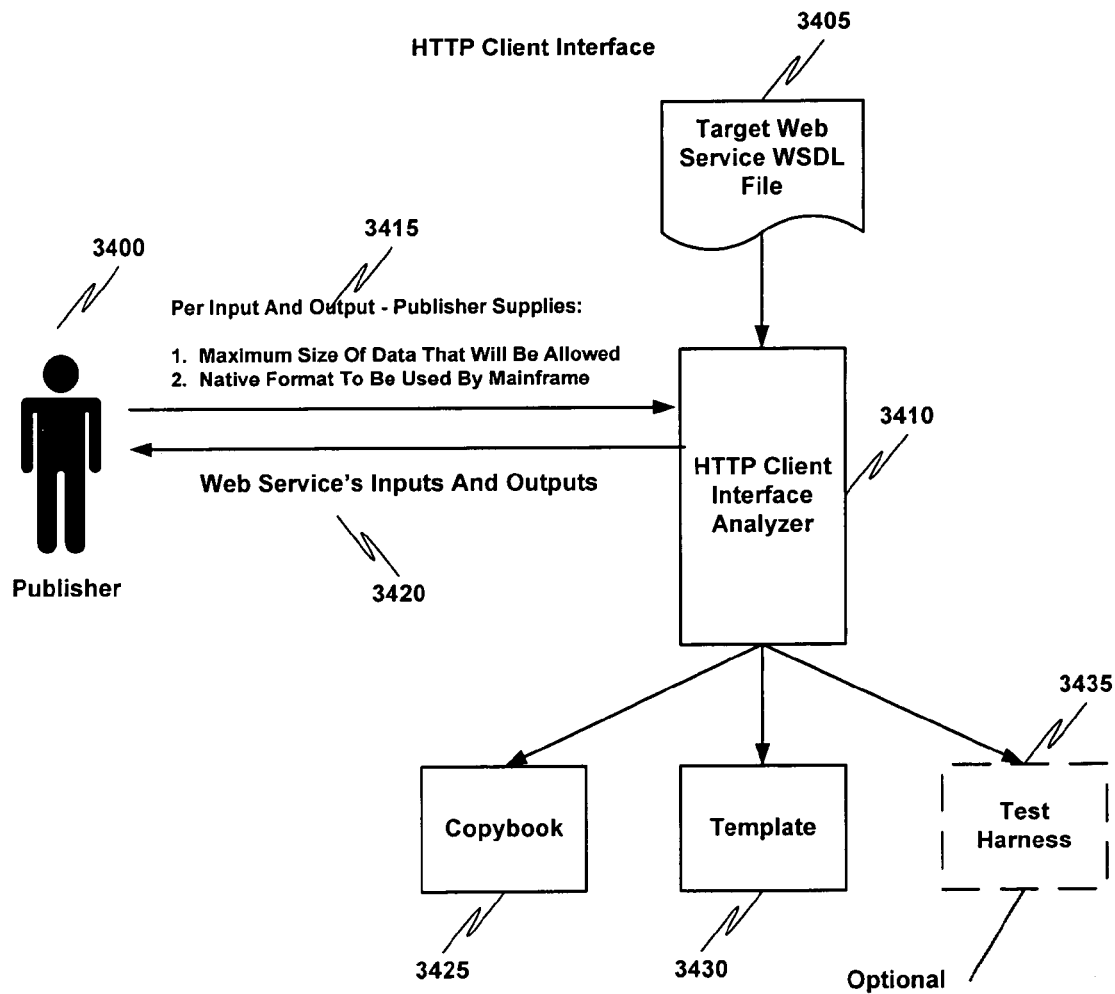
FIG. 34 is a block diagram that illustrates an apparatus for creating an HTTP client interface template in accordance with one embodiment of the present invention.
Figure 35:
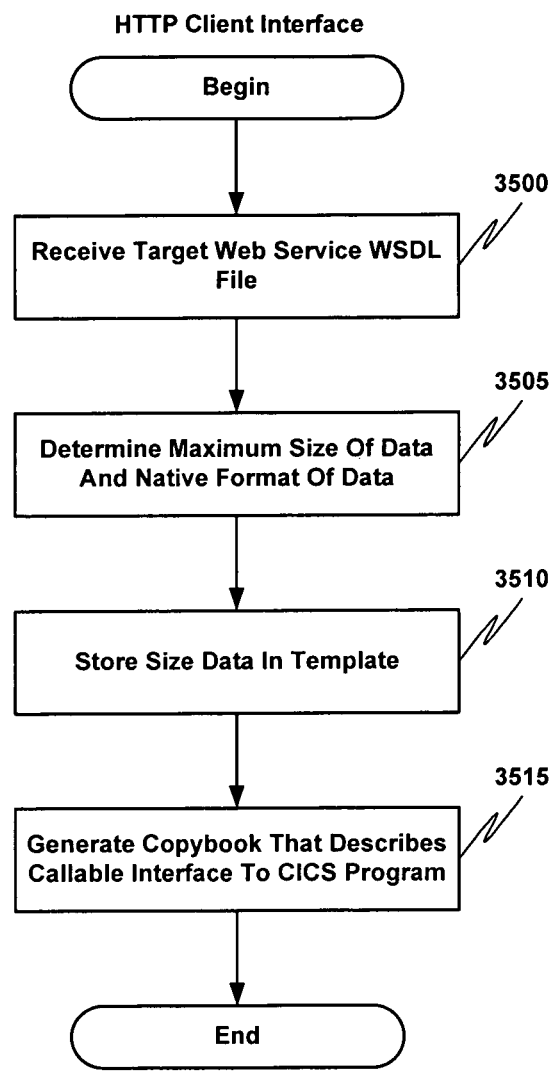
FIG. 35 is a block diagram that illustrates a method for creating an HTTP client interface template in accordance with one embodiment of the present invention.

FIGS. 32-35 illustrate enabling a legacy application program to execute a Web Service via a callable interface in accordance with one embodiment of the present invention. FIGS. 32-33 illustrate operational aspects of the interface, and FIGS. 34-35 illustrate creating a template for subsequent use in enabling a legacy application program to execute a Web Service.

Turning now to FIG. 32, a block diagram that illustrates a system for enabling a CICS program to execute a Web Service via a callable interface in accordance with one embodiment of the present invention is presented. As shown in FIG. 32, a Web Service 3200 is in communication with a client 3210 via network 3205. Client 3210 comprises a network interface 3215, one or more copybooks 3260, one or more templates 3230, one or more legacy applications 3235 and one or more HTTP interface plug-ins 3225. Network interface 3215 is configured to handle communications between the Web Services application 3200 and HTTP interface plug-ins 3225 of client 3210. HTTP interface plug-in 3225 is configured to receive input values from legacy application program 3235 via copybook 3260, load a template specified in the copybook 3260, construct a SOAP request 3250 for target Web Service 3200, and post the SOAP request. Web Service 3200 receives the request 3250 and returns a corresponding response 3255. The HTTP interface plug-in is further configured to receive the SOAP response 3255, format it based at least in part on the template, and populate the copybook 3260 for return to the legacy application program 3235. The one or more templates 3230 comprise metadata regarding input data and output data for the legacy application 3235.

Many other devices or subsystems (not shown) may be connected in a similar manner. Also, it is not necessary for all of the components shown in FIG. 32 to be present to practice the present invention, as discussed below. Furthermore, the components may be interconnected in different ways from that shown in FIG. 32. Code to implement the present invention may be operably disposed in system memory or stored on storage media such as fixed disk, floppy disk, or CD-ROM.

According to one embodiment of the present invention, request 3250 comprises an HTTP request and response 3255 comprises an HTTP response. According to another embodiment of the present invention, request 3250 comprises an MQ request and response 3255 comprises an MQ response. Those of ordinary skill in the art will recognize that other request/response protocols may be used.

Turning now to FIG. 33, a flow diagram that illustrates a method for enabling a CICS program to execute a Web Service via a callable interface in accordance with one embodiment of the present invention is presented. FIG. 33 corresponds with FIG. 32. The processes illustrated in FIG. 33 may be implemented in hardware, software, firmware, or a combination thereof. At 3300, a legacy application program populates Web Service input values based at least in part on a copybook definition that describes the callable interface to the host CICS program. At 3305, the legacy application program calls the plug-in with the copybook specified as an input. At 3310, the plug-in receives the input values. At 3315, the plug-in loads the template specified in the copybook. At 3320, the plug-in constructs a SOAP request 3350 for the target Web Service. At 3325, the SOAP request 3350 is posted. At 3345, the Web Service receives the SOAP request 3350 and issues a corresponding SOAP response 3355. At 3330, the plug-in receives the SOAP response 3355. At 3335, the output data in the SOAP response 3355 is formatted based at least in part on the template. At 3340, the copybook is populated for return to the legacy application program.

Turning now to FIG. 34, a block diagram that illustrates an apparatus for creating an HTTP client interface template in accordance with one embodiment of the present invention is presented. Template 3430 corresponds with template 3230 of FIG. 32. As shown in FIG. 34, an HTTP client interface analyzer 3410 receives a target Web Service WSDL file 3405. The analyzer 3410 examines the supplied information to determine the Web Service's inputs and outputs 3420, which are presented to the publisher 3400. The publisher 3400 supplies information for each input and output, including (1) the maximum size of data that will be allowed, and (2) a native format to be used by the mainframe. The analyzer 3410 produces a template 3430, a copybook 3425, and optionally produces a test harness 3435 for automating testing of template.

Many other devices or subsystems (not shown) may be connected in a similar manner. Also, it is not necessary for all of the components shown in FIG. 34 to be present to practice the present invention, as discussed below. Furthermore, the components may be interconnected in different ways from that shown in FIG. 34. Code to implement the present invention may be operably disposed in system memory or stored on storage media such as fixed disk, floppy disk, or CD-ROM.

Turning now to FIG. 35, a block diagram that illustrates a method for creating an HTTP client interface template in accordance with one embodiment of the present invention is presented. FIG. 35 corresponds with FIG. 34. The processes illustrated in FIG. 35 may be implemented in hardware, software, firmware, or a combination thereof. At 3500, a target Web Service WSDL file is received. At 3505, for each input and output, the maximum size of data and the native format of the data are determined. At 3510, the size data is stored in the template. At 3515, a copybook that describes the callable interface to the CICS program is generated.

While the operations shown in FIG. 35 are illustrated in a specific order, other sequences of the operations are conceivable, for example, operations 3510 and 3515 may be performed in any order with respect to each other.

While embodiments of the present invention have been illustrated using particular computer platforms and computer languages, embodiments of the present invention apply to any computer platform and any computer language.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer server comprising: one or more processors; and a memory coupled to the processors comprising instructions executable by the processors, the processors being operable when executing the instructions to:
    receive a request from a client application, the request comprising:
        a legacy application program identifier corresponding to one of a plurality of legacy application programs;
        a legacy type program identifier comprising an interface plug-in identifier that identifies a dynamic SQL interface plug-in;
        input data; and
        a template identifier for a template comprising metadata for use when formatting the input data for use by the corresponding legacy application program and when formatting output data received from the legacy application program for use by the client application;
    obtain a template based at least in part on the template identifier, wherein the template comprises a header portion and a plurality of data element descriptor portions, each of the one or more data element descriptor portions used for communicating information between the interface plug-in and the corresponding legacy application program;
    generate a test harness for automated testing of the template based at least in part on metadata in the template;
    format the input data based at least in part on metadata in the template;
    invoke the corresponding legacy application program, the invoking comprising sending the formatted legacy application input data to the legacy application program;
    receive, from the corresponding legacy application program, output data;
    format the output data based at least in part on the metadata; and
    transmit a response to the client application, the response comprising the formatted output data.

2. The computer server of claim 1, further comprising a network interface.

3. The computer server of claim 1, wherein the processors utilize the interface plug-in to invoke the corresponding legacy application program.

4. The computer server of claim 1, wherein the processors utilize a common driver to obtain the template.

5. The computer server of claim 1, wherein the request comprises:
    a Simple Object Access Protocol (SOAP) request;
    a Hypertext Transfer Protocol (HTTP) request; or
    an MQ request.

6. The computer server of claim 1, wherein the response comprises:
    a Simple Object Access Protocol (SOAP) response;
    a Hypertext Transfer Protocol (HTTP) response; or
    an MQ response.

7. The computer server of claim 1, wherein the interface plug-in and a common driver comprise a single application program.

8. The computer server of claim 1, wherein:
    the request comprises a Simple Object Access Protocol (SOAP) request; and
    the template maps the SOAP request to an interface.

9. The computer server of claim 1, wherein:
    the request comprises a Simple Object Access Protocol (SOAP) request;
    the template maps the SOAP request to an interface; and
    the interface comprises a COMMAREA interface.

10. A method comprising:
    receiving, by one or more computer servers, a request from a client application, the request comprising:
        a legacy application program identifier corresponding to one of a plurality of legacy application programs;
        a legacy type program identifier comprising an interface plug-in identifier that identifies a dynamic SQL interface plug-in;
        input data; and
        a template identifier for a template comprising metadata for use when formatting the input data for use by the corresponding legacy application program for use by the client application;
    obtaining, by one or more computer servers, a template based at least in part on the template identifier, wherein the template comprises a header portion and a plurality of data element descriptor portions, each of the one or more data element descriptor portions used for communicating information between the interface plug-in and the corresponding legacy application program;
    generating, by one or more computer servers, a test harness for automated testing of the template based at least in part on metadata in the template;
    formatting, by one or more computer servers, the input data based at least in part on metadata in the template;
    invoking, by one or more computer servers, the corresponding legacy application program, the invoking comprising sending the formatted legacy application input data to the legacy application program;
    receiving, by one or more computer servers, from the corresponding legacy application program, output data;

formatting, by one or more computer servers, the output data based at least in part on the metadata; and transmitting, by one or more computer servers, a response to the client application, the response comprising the formatted output data.

11. The method of claim 10, wherein the network servers comprise a network interface.

12. The method of claim 10, wherein the computer servers utilize the interface plug-in to invoke the corresponding legacy application program.

13. The method of claim 10, wherein the computer server utilizes a common driver to obtain the template.

14. The method of claim 10, wherein the request comprises:
a Simple Object Access Protocol (SOAP) request;
a Hypertext Transfer Protocol (HTTP) request; or
an MQ request.

15. The method of claim 10, wherein the response comprises:
a Simple Object Access Protocol (SOAP) response;
a Hypertext Transfer Protocol (HTTP) response; or
an MQ response.

16. The method of claim 10, wherein the interface plug-in and a common driver comprise a single application program.

17. One or more computer-readable non-transitory storage media embodying software that is operable when executed to:
receive a request from a client application, the request comprising:
a legacy application program identifier corresponding to one of a plurality of legacy application programs;
a legacy type program identifier comprising an interface plug-in identifier that identifies a dynamic SQL interface plug-in;
input data; and
a template identifier for a template comprising metadata for use when formatting the input data for use by the corresponding legacy application program and when formatting output data received from the legacy application program for use by the client application;
obtain a template based at least in part on the template identifier, wherein the template comprises a header portion and a plurality of data element descriptor portions, each of the one or more data element descriptor portions used for communicating information between the interface plug-in and the corresponding legacy application program;
generate a test harness for automated testing of the template based at least in part on metadata in the template;
format the input data based at least in part on metadata in the template;
invoke the corresponding legacy application program, the invoking comprising sending the formatted legacy application input data to the legacy application program;
receive, from the corresponding legacy application program, output data;
format the output data based at least in part on the metadata; and
transmit a response to the client application, the response comprising the formatted output data.

18. The media of claim 17, wherein a network interface is utilized.

19. The media of claim 17, wherein the interface plug-in is utilized to invoke the corresponding legacy application program.

20. The media of claim 17, wherein a common driver is utilized to obtain the template.

21. The media of claim 17, wherein the request comprises:
a Simple Object Access Protocol (SOAP) request;
a Hypertext Transfer Protocol (HTTP) request; or
an MQ request.

22. The media of claim 17, wherein the response comprises:
a Simple Object Access Protocol (SOAP) response;
a Hypertext Transfer Protocol (HTTP) response; or
an MQ response.

23. The media of claim 17, wherein the interface plug-in and a common driver comprise a single application program.

24. A computer server comprising:
means for receiving a request from a client application, the request comprising:
a legacy application program identifier corresponding to one of a plurality of legacy application programs;
a legacy type program identifier comprising an interface plug-in identifier that identifies a dynamic SQL interface plug-in;
input data; and
a template identifier for a template comprising metadata for use when formatting the input data for use by the corresponding legacy application program and when formatting output data received from the legacy application program for use by the client application;
means for obtaining a template based at least in part on the template identifier, wherein the template comprises a header portion and a plurality of data element descriptor portions, each of the one or more data element descriptor portions used for communicating information between the interface plug-in and the corresponding legacy application program;
means for generating a test harness for automated testing of the template based at least in part on metadata in the template;
means for formatting the input data based at least in part on the metadata in the template;
means for invoking the corresponding legacy application program, the invoking comprising sending the formatting legacy application input data to the legacy application program;
means for receiving, from the corresponding legacy application program, output data;
means for formatting the output data based at least in part on the metadata; and
means for transmitting a response to the client application, the response comprising the formatted output data.

25. The computer server of claim 24, further comprising a network interface.

26. The computer server of claim 24, wherein the interface plug-in is utilized to invoke the corresponding legacy application program.

27. The computer server of claim 24, wherein a common driver is utilized to obtain the template.

28. The computer server of claim 24, wherein the request comprises:
a Simple Object Access Protocol (SOAP) request;
a Hypertext Transfer Protocol (HTTP) request; or
an MQ request.

29. The computer server of claim 24, wherein the response comprises:

a Simple Object Access Protocol (SOAP) response;
a Hypertext Transfer Protocol (HTTP) response; or
an MQ response.

30. The computer server of claim 24, wherein the interface plug-in and a common driver comprise a single application program.

* * * * *